United States Patent
Kitamura et al.

(10) Patent No.: US 8,947,602 B2
(45) Date of Patent: Feb. 3, 2015

(54) TELEVISION RECEIVER AND ELECTRONIC DEVICE

(75) Inventors: Tomoko Kitamura, Tokyo (JP);
Toshikazu Shiroishi, Tokyo (JP);
Tomohiro Hamada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 310 days.

(21) Appl. No.: 13/615,141

(22) Filed: Sep. 13, 2012

(65) Prior Publication Data

US 2013/0194513 A1 Aug. 1, 2013

(30) Foreign Application Priority Data

Jan. 31, 2012 (JP) .................................. 2012-019246

(51) Int. Cl.
*H04N 5/64* (2006.01)
*G06F 1/16* (2006.01)

(52) U.S. Cl.
USPC ............................................................. 348/836

(58) Field of Classification Search
USPC ............................................................. 348/836
See application file for complete search history.

(56) References Cited

U.S. PATENT DOCUMENTS

| | | | | |
|---|---|---|---|---|
| 7,170,750 | B2 * | 1/2007 | Tanaka ........................... | 361/719 |
| 7,466,548 | B2 * | 12/2008 | Ishikawa ....................... | 361/698 |
| 2005/0117307 | A1 | 6/2005 | Tanaka | |
| 2011/0310313 | A1 * | 12/2011 | Nakamura et al. ............ | 348/836 |
| 2012/0081351 | A1 * | 4/2012 | Yokota ........................... | 345/211 |
| 2014/0036162 | A1 * | 2/2014 | Sato et al. ..................... | 348/836 |
| 2014/0226072 | A1 * | 8/2014 | Ikuta .............................. | 348/725 |

FOREIGN PATENT DOCUMENTS

| | | |
|---|---|---|
| JP | 3057715 U | 3/1999 |
| JP | 2003-304084 A | 10/2003 |
| JP | 2005-166715 A | 6/2005 |
| JP | 2006-108166 A | 4/2006 |
| JP | 2012-004453 A | 1/2012 |

OTHER PUBLICATIONS

Notice of Rejection mailed by Japan Patent Office on Dec. 18, 2012 in the corresponding to Japanese patent application No. 2012-019246 in 3 pages.

* cited by examiner

*Primary Examiner* — Sath V Perungavoor
*Assistant Examiner* — Howard D Brown, Jr.
(74) *Attorney, Agent, or Firm* — Knobbe, Martens, Olson & Bear LLP

(57) ABSTRACT

According to one embodiment, television receiver includes: first component; second component; pressing member. The pressing member includes: two second fixing portions; pressing portion; first and second arms; first and second reinforcements. Pressing portion presses the first component. First and second arms extend between the pressing portion and the two second fixing portions, respectively. First reinforcement includes a first portion extended from one of the second fixing portions to a first middle point between the one of the second fixing portion and the pressing portion, and positioned away from one of the first fixing portions. Second reinforcement includes a second portion extended from other one of the second fixing portions to a second middle point between the other one of the second fixing portions and the pressing portion, and positioned away from other one of the fixing portions. Second fixing portions are positioned on one side of the first component.

12 Claims, 23 Drawing Sheets

↑XXX

TELEVISION RECEIVER AND ELECTRONIC DEVICE

CROSS-REFERENCE TO RELATED APPLICATIONS

This application is based upon and claims the benefit of priority from Japanese Patent Application No. 2012-019246, filed on Jan. 31, 2012, the entire contents of which are incorporated herein by reference.

FIELD

Embodiments described herein relate generally to a television receiver and an electronic device.

BACKGROUND

There has been known electronic devices provided with a pressing member for pressing a component against another component have been known.

The pressing member of such electronic devices are required to efficiently press the component against another component.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
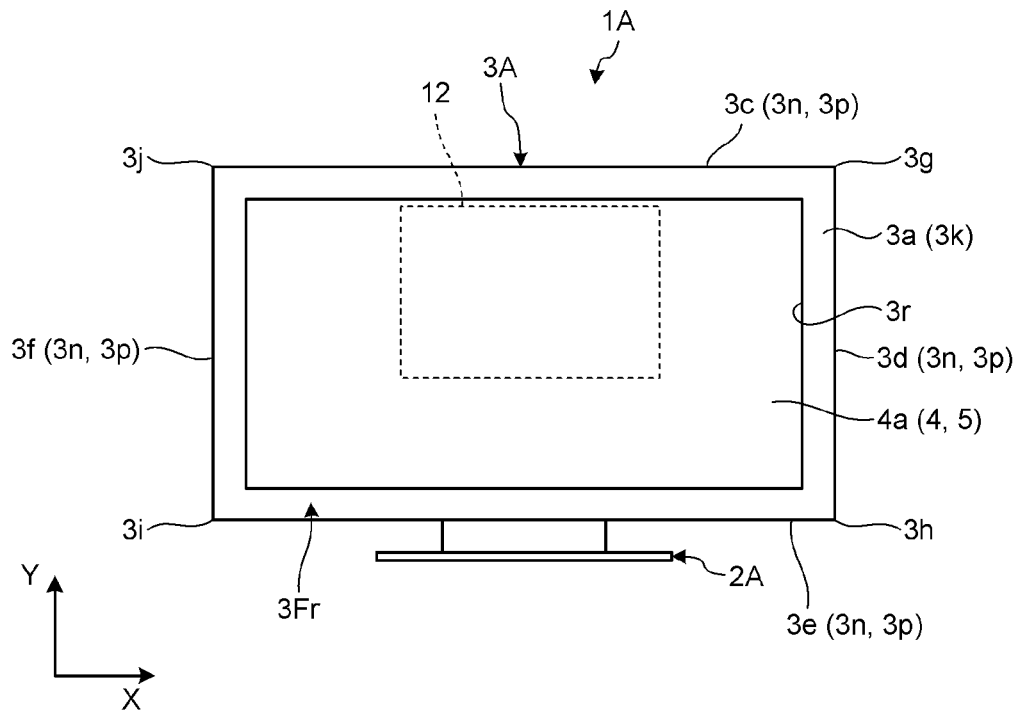
FIG. 1 is an exemplary front view of a television receiver according to a first embodiment.

In general, according to one embodiment, a television receiver comprises: a housing; a display; a first component; a second component; and a pressing member. The display comprises a screen. At least a portion of the display is housed in the housing. The first component is configured to be housed in the housing on a side of the display opposite the screen of the display. The second component is configured to be housed in the housing on the side of the display opposite the screen of the display, and to overlap with the first component. The pressing member is configured to be housed in the housing on the side of the display opposite the screen of the display, and to press the first component against the second component. The pressing member comprises two second fixing portions, a pressing portion, a first arm, a second arm, a first reinforcement, and a second reinforcement. The two second fixing portions are configured to be fixed to two first fixing portions, respectively, provided in the housing. The pressing portion is configured to press the first component. The first arm is connected to the pressing portion and extended between the pressing portion and one of the two second fixing portions. The second arm is connected to the pressing portion and extended between the pressing portion and other one of the two second fixing portions. The first reinforcement comprises a first portion extended from the one of the second fixing portions of the first arm to a first middle point between the one of the second fixing portion and the pressing portion, and positioned away from one of the first fixing portions. The second reinforcement comprises a second portion extended from the other one of the second fixing portions of the second arm to a second middle point between the other one of the second fixing portions and the pressing portion, and positioned away from other one of the first fixing portions. The second fixing portions are positioned on one side of the first component.

The following exemplary embodiments and modifications comprise identical elements. The same elements are labeled with the same reference numerals and the duplicated descriptions are omitted. Corresponding parts of the embodiments and the modifications are replaceable with each other. Some drawings are illustrated with directions (an X direction, a Y direction, and a Z direction) for the sake of convenience. The X direction is the lengthwise direction of a housing 3A or a first housing 3B as viewed from the front of a board 12. The Y direction is the width direction of the housing 3A or the first housing 3B as viewed from the front of the board 12. The Z direction is the thickness direction of the housing 3A or the first housing 3B as viewed from the front of the board 12. The X, Y, and Z directions are orthogonal to each other.

In the following embodiments, a television receiver and a personal computer are described as the examples of an electronic device. The electronic device, however, is not limited to the television receiver and the personal computer. For example, the electronic device may be various types of electronic devices housing pressing members for pressing a component, such as smartphones, smartbooks, cellular phones, personal digital assistants (PDAs), image display devices, videophone devices, image display control devices, and information storage devices.

Figure 2:
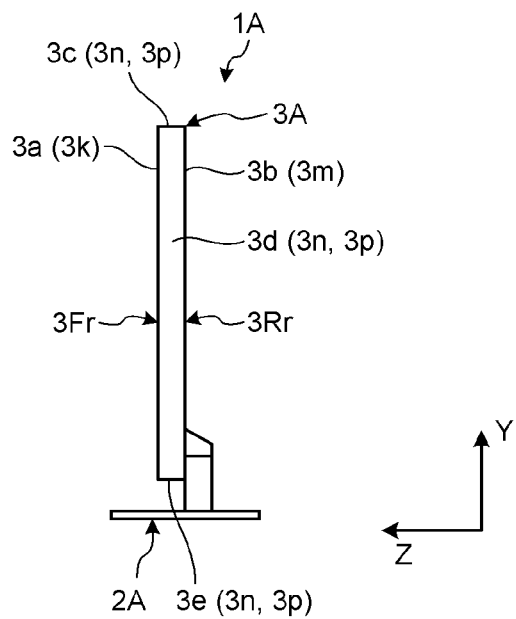
FIG. 2 is an exemplary side view of the television receiver in the first embodiment.

In a first embodiment, as exemplarily illustrated in FIGS. 1 and 2, a television receiver 1A, which is an example of the electronic device, comprises a supporting portion 2A (a support, a table, or a stand) and the housing 3A. Specifically, the supporting portion 2A is placed on a placement portion (a placement surface, which is not illustrated) of a desk, a rack, or a table, for example, and supports the housing 3A in a standing state. The supporting portion 2A may support the housing 3A in a fixed state or in a movable state (rotatable or slidable). Examples of a moving manner (rotation manner) of the housing 3A with respect to the supporting portion 2A include tilting, swiveling, and pivoting.

In the first embodiment, as exemplarily illustrated in FIG. 1, the housing 3A has a rectangular shape (in the embodiment, e.g., an oblong shape) as viewed from the front and rear. As illustrated in FIG. 2, the housing 3A is configured in a thin flat rectangular parallelepiped shape in the front-back direction (the thickness direction of the housing 3A or the Z direction). The housing 3A comprises a surface 3a (a front, a front surface, or a surface portion) and a surface 3b (a rear, a rear surface, or a surface portion) opposite the surface 3a. The surfaces 3a and 3b are provided nearly parallel to each other (in the embodiment, e.g., in parallel with each other). As illustrated in FIG. 1, the housing 3A comprises four edges 3c to 3f (sides or frames) and four corners 3g to 3j (sharp edges, bent portions, or edges) as viewed from the front. The edges 3c and 3e are examples of a long side. The edges 3d and 3f are examples of a short side. The housing 3A can function as a container portion housing parts (not illustrated) and also function as a support for supporting heavy weight components (such as a display 4 and parts), for example.

The housing 3A comprises a wall 3k (a portion, a plate, a frame, a front wall, a frontward wall, or a ceiling wall) comprising the surface 3a, and a wall 3m (a portion, a plate, a back wall, a backward wall, or a bottom wall) comprising the surface 3b. The walls 3k and 3m have rectangular shapes (in the embodiment, e.g., oblong shapes). The wall 3k has a frame shape while the wall 3m has a platy shape. The housing 3A comprises four walls 3n (portions, plates, side walls, edge walls, upright walls, or extending portions) comprising a surface 3p (a side surface or a surrounding surface) that extends between the walls 3k and 3m. The wall 3k is provided with a rectangular opening 3r.

The housing 3A is configured by combining a plurality of parts (divided bodies or members). For example, the housing 3A comprises a first member 3Fr (a first portion, a front side member, a cover, a bezel, or a frame) comprising at least the wall 3k, and a second member 3Rr (a second portion, a back side member, a base, a bottom, a plate, or a cover) comprising at least the wall 3m. In the embodiment, the walls 3n are configured as a part of the second member 3Rr, for example. The housing 3A can comprise a third member (a third portion, an intermediate member, an inner member, a middle frame, or a middle plate), which is not illustrated, besides the first member 3Fr and the second member 3Rr. A part of the third member can include parts of the walls 3k, 3m, and 3n. The first member 3Fr, the second member 3Rr, and the third member can be made of a metal material or a synthetic resin material, for example.

In the embodiment, the housing 3A houses the display 4 (a display portion, a display, a panel, or a display part), for example. A display screen 4a, which is located on a side adjacent to the surface 3a, of the display 4 is exposed from the opening 3r in a forward (outward) direction from the housing 3A. A user can view the display screen 4a through the opening 3r from the front. The display 4 has a rectangular shape (in the embodiment, e.g., an oblong shape) as viewed from the front. The display 4 is formed in a thin and flat rectangular parallelepiped shape in the front-back direction. The display 4 may be a liquid crystal display (LCD), an organic electroluminescent display (OLED), or a plasma display panel (PDP), for example.

In the embodiment, an input operation panel 5 (e.g., a touch panel, a touch sensor, an operation surface, an input operation module, or an input reception module), which is transparent and has a relatively thin rectangular shape, is disposed on a front side (a frontward side or a side adjacent to the wall 3k), for example. The input operation panel 5 covers the display screen 4a. An operator (or a user) can perform input processing by operation such as touching, pressing, and rubbing the input operation panel 5 with fingers or a stylus, or moving fingers or the stylus near the input operation panel 5, for example. Light emitted from the display screen 4a of the display 4 passes through the input operation panel 5 and travels in the forward (outward) direction from the housing 3A through the opening 3r disposed on the wall 3k. The input operation panel 5 is an example of an input module. In the embodiment, the display 4 and the input operation panel 5 are fixed to (supported by) any of the first member 3Fr, the second member 3Rr, and the third member with fixtures (fixing parts or clasps such as screws, clasps, and parts, which are not illustrated) or an adhesive portion (such as adhesive or a double-sided adhesive tape, which is not illustrated), for example.

Figure 3:
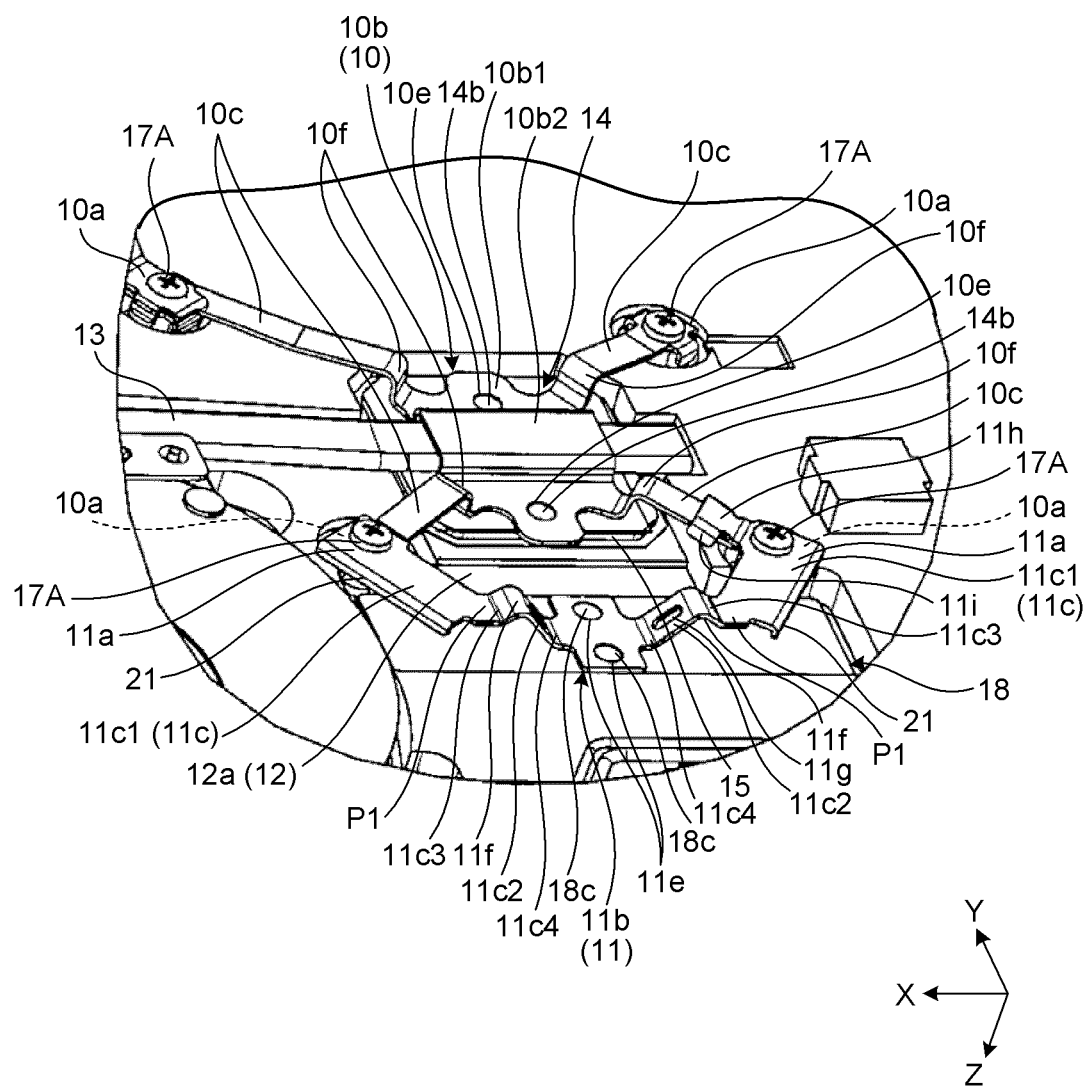
FIG. 3 is an exemplary perspective view of an internal structure of the television receiver in the first embodiment.
Figure 4:
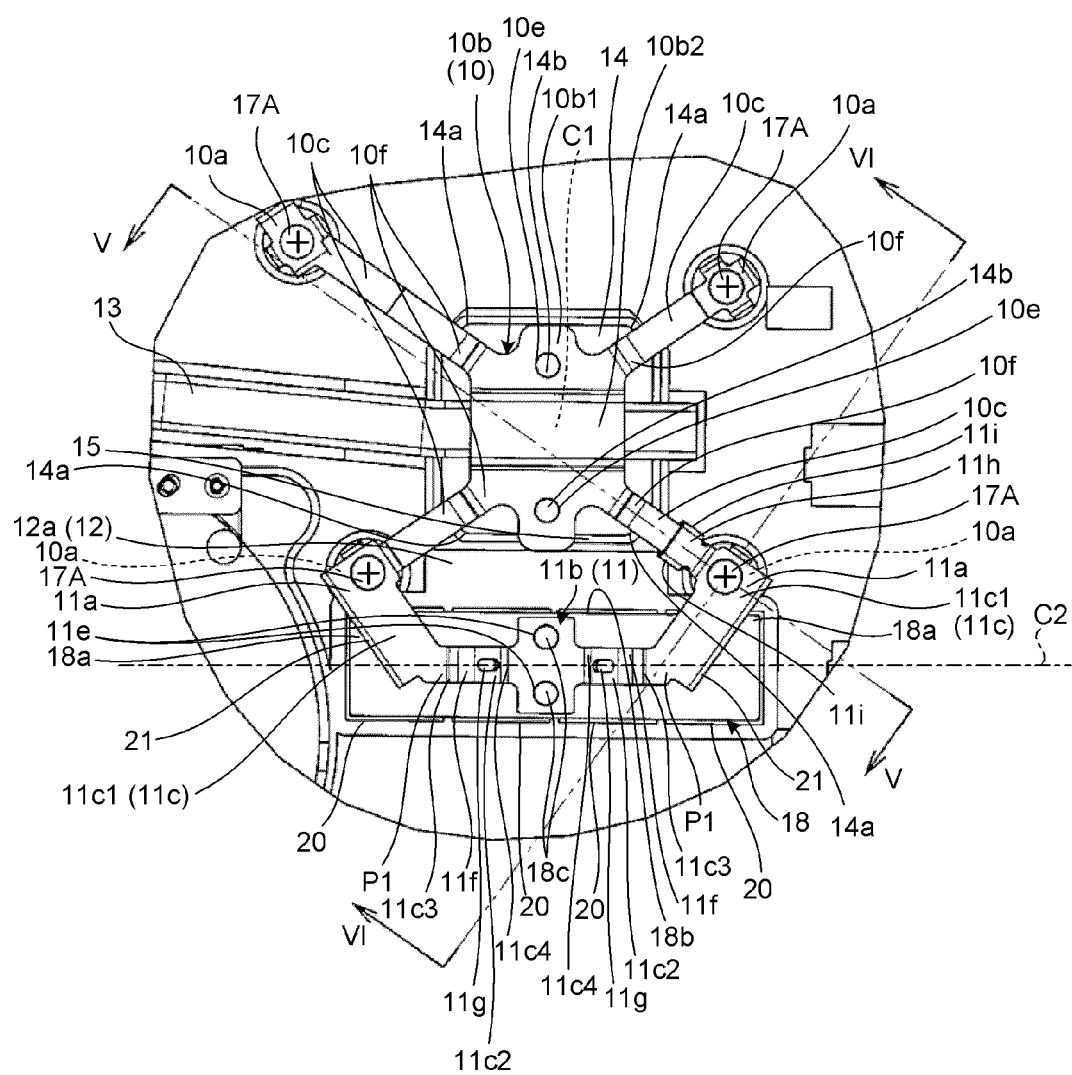
FIG. 4 is an exemplary plan view of the internal structure of the television receiver in the first embodiment.

In the embodiment, as exemplarily illustrated in FIGS. 3 to 6, pressing members 10 and 11 are provided inside the housing 3A. Specifically, as illustrated in FIG. 4, the pressing member 10 is formed in an X shape and the pressing member 11 is formed in a V shape in the plan view of a surface 12a (as viewed in a direction normal to the surface 12a of the board 12) of the board 12 (a circuit board, a control board, a main board, or an electrical component). The pressing members 10 and 11 are made of a metal material having elasticity and flexibility (e.g., an iron-based material). The pressing members 10 and 11 are platy members formed by being bent. The thicknesses of the pressing members 10 and 11 can be overall constant. The thicknesses of the pressing members 10 and 11 can differ from part to part. The pressing members 10 and 11 are made of a material having relatively high thermal conductivity (e.g., a metal material). That is, the pressing members 10 and 11 are examples of a heat transfer member.

In the embodiment, the pressing member 10 presses a heat pipe 13 (a portion, a cooling portion, a cooler, a heat receiver, a heat transfer portion, or a heat dissipator) to a heat transfer member 14 (a portion, a heat transfer portion, a heat receiver, a heat transfer portion, or a heat dissipator), for example. In addition, the pressing member 10 presses the heat pipe 13 and the heat transfer member 14 (component) against an element 15 (a component, an electronic component, a chip, a package, a semiconductor, a second component, or a heating element).

In the embodiment, the pressing member 10 comprises fixing portions 10a, a pressing portion 10b, and arms 10c, for example. Each fixing portion 10a (a base, a joint, or an attaching portion) is jointed (fixed) to a stud 16 at a position located off the heat transfer member 14 and the element 15, which are the components pressed by the pressing member 10, in the plan view of the board 12. The stud 16 is an example of a fixing portion (a base, a joint, an attaching portion, a supporter, a protrusion, a component, a first fixing portion). The stud 16 is fixed (jointed) to the board 12 and the board 12 is fixed (jointed) to the housing 3A. That is, the fixing portion 10a is fixed (jointed) to the stud 16, the board 12, and the housing 3A. The stud 16 (a joint 16a of the stud 16) protrudes above the surface 12a of the board 12. A jointing member 17A (in the embodiment, e.g., a screw), which passes through an opening 10d, is jointed to the joint 16a (in the embodiment, e.g., a female screw) of the stud 16. As a result, the fixing portion 10a is fixed to the edge, which is away from the surface 12a, of the joint 16a of the stud 16. The stud 16 comprises a joint 16b (in the embodiment, e.g., a male screw). The joint 16b passes through an opening 12b (a through hole or a notch, in the embodiment, e.g., a through hole) disposed on the board 12. A jointing member 17B (in the embodiment, e.g., a nut) is fixed (jointed) to the opposite portion of the joint 16b from the portion to which the fixing portion 10a is fixed. As a result, the stud 16 is fixed to the board 12. In the embodiment, the joint 16a and the jointing member 17B sandwich the board 12 in the thickness direction of the board 12, for example.

In the embodiment, a plurality of fixing portions 10a (in the embodiment, e.g., four fixing portions 10a) (and the studs 16) are positioned near a plurality of respective corners 14a (in the embodiment, e.g., four corners 14a), for example. Each fixing portion 10a is positioned on the corresponding nearest corner 14a on the opposite side from a central area C1 (refer to FIG. 4) in the plan view (viewed as illustrated in FIG. 4) of the heat transfer member 14 and the element 15. The fixing portion 10a is provided with an opening 10d (a through hole or a notch, in the embodiment, e.g., a through hole, refer to FIGS. 5 and 6). The fixing portion 10a may be jointed to a portion other than the stud 16 (e.g., the board 12 or the housing 3A). The stud 16 can be jointed to the board 12 with other configuration (e.g., a screw) interposed therebetween or by other method (e.g., a method using adhesive or soldering).

Figure 5:
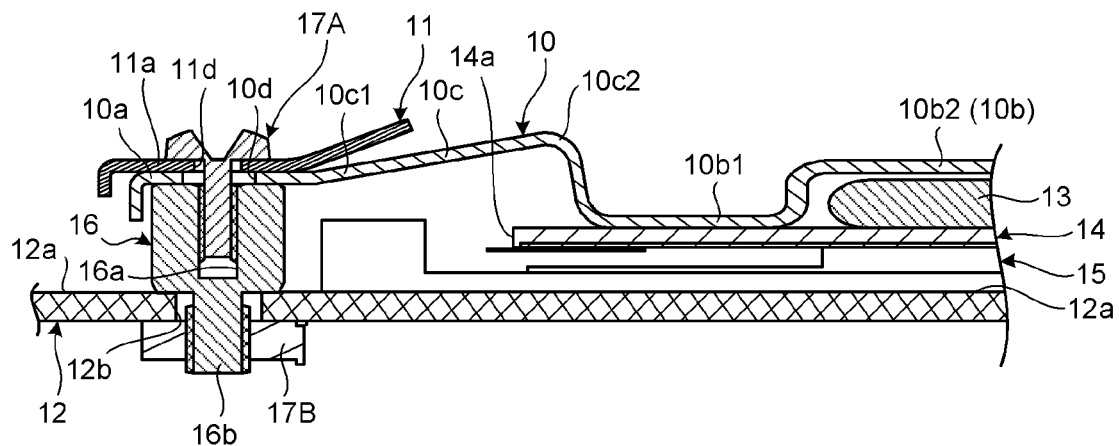
FIG. 5 is an exemplary cross sectional view taken along line V-V of FIG. 4, in the first embodiment.

In the embodiment, as exemplarily illustrated in FIG. 5, the pressing portion 10b is positioned on the opposite side of the heat pipe 13 with respect to the heat transfer member 14 and also on the opposite sides of the heat pipe 13 and the heat transfer member 14 with respect to the element 15. That is, the pressing portion 10b overlaps with the board 12, the heat pipe 13, the heat transfer member 14, and the element 15 in the thickness direction of the board 12. The pressing portion 10b covers the central area C1 of the heat transfer member 14 and the element 15 in the plan view of the surface 12a of the board 12. The pressing portion 10b has a quadrangular shape (in the embodiment, e.g., a square shape) in the plan view. The pressing portion 10b has a platy shape. The pressing portion 10b comprises a portion 10b1 (a first portion or an area) that covers (presses) the heat transfer member 14 and a portion 10b2 (a second portion or an area) that covers (presses) the heat pipe 13. The portion 10b2 is formed as a protrusion (a bulge) protruding from the portion 10b1 away from the heat transfer member 14 and extending along the heat pipe 13. The heat pipe 13 is positioned between the portion 10b2 and the heat transfer member 14. In the embodiment, as illustrated in FIGS. 3 and 4, the portion 10b1 is provided with openings 10e (through holes or notches, in the embodiment, e.g., through holes). Projections 14b disposed on the heat transfer member 14 are inserted into the openings 10e. As a result, the pressing member 10 and the heat transfer member 14 are positioned. The projections 14b and the pressing member 10 can be jointed by swaging (deforming) portions, which are inserted into the openings 10e, of the projections 14b.

In the embodiment, as exemplarily illustrated in FIG. 4, each arm 10c extends between the fixing portion 10a and the pressing portion 10b so as to connect to the fixing portion 10a and the pressing portion 10b with each other. The arm 10c extends between the fixing portion 10a and the pressing portion 10b with a nearly constant width and has a belt-like platy shape. The arm 10c comprises a bent portion 10f between the fixing portion 10a and the pressing portion 10b.

In the embodiment, the arms 10c are mainly elastically deformed, while the pressing member 10 thus structured is attached to the stud 16 and the heat transfer member 14. Specifically, each arm 10c is elastically deformed in such a state that a distance between an end portion 10c1 located near the fixing portion 10a and an end portion 10c2 located near the pressing portion 10b of the arm 10c in the thickness direction of the board 12 (a direction perpendicular to FIG. 4 or the Z direction) is longer than that in a free state (when the pressing member 10 is not attached to the stud 16 and the heat transfer member 14). That is, the arms 10c are bent in a convex shape toward the surface 12a of the board 12. As a result, a pressing force (elastic force or repulsive force) generated by the elastic deformation of the arms 10c acts on the heat transfer member 14 and the heat pipe 13, for example, from the pressing portion 10b.

The element 15 is a semiconductor element such as an integrated circuit (IC), a large scale IC (LSI), a central processing unit (CPU), and a controller, for example. The element 15 is attached to (mounted on or fixed to) the surface 12a of the board 12 by soldering, for example. The element 15 may be a surface mount component. The element 15 has a quadrangular shape (in the embodiment, e.g., a square shape) in the plan view of the surface 12a of the board 12 and is formed in a thin and flat rectangular shape in the thickness direction of the board 12.

The heat transfer member 14 is made of a metal material having relatively high thermal conductivity (e.g., aluminum alloys), for example. The heat transfer member 14 has a quadrangular shape (in the embodiment, e.g., a square shape) in the plan view of the surface 12a of the board 12 and is formed in a thin and flat rectangular shape in the thickness direction of the board 12. Another heat transfer member (e.g., grease, which is not illustrated) can be interposed between the heat transfer member 14 and the element 15.

Figure 6:
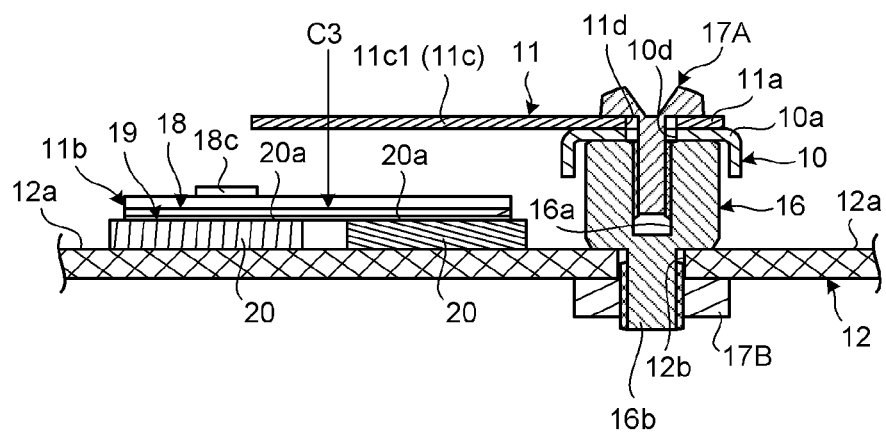
FIG. 6 is an exemplary cross sectional view taken along line VI-VI of FIG. 4m, in the first embodiment.

In the embodiment, as exemplarily illustrated in FIGS. 3, 4, and 6, the pressing member 11 presses a heat transfer member 18 (a first component, a component, a member, a cooling component, a cooler, a heat receiver, a heat transfer portion, or a heat dissipator) against a heat transfer member 19 (a second component, a component, a member, a cooling component, a cooler, a heat receiver, a heat transfer portion, or a heat dissipator). In addition, the pressing member 11 presses the heat transfer members 18 and 19 (the first and second components or the components) against an element 20 (a second component, a component, an electronic component, a chip, a package, or a semiconductor component). In the embodiment, the heat transfer member 18 has a quadrangular shape (in the embodiment, e.g., a rectangular shape) in the plan view of the surface 12a of the board 12 and is formed in a thin and flat rectangular shape in the thickness direction of the board 12, and is harder than the heat transfer member 19, for example. In the embodiment, the heat transfer member 19 has a quadrangular shape (in the embodiment, e.g., a rectangular shape) in the plan view of the surface 12a of the board 12 and is formed in a thin and flat rectangular shape in the thickness direction of the board 12, and is softer than the heat transfer member 18, for example. The heat transfer members 18 and 19 are stacked on each other and have the approximately same shape in the plan view of the surface 12a of the board 12. The heat transfer member 18 can be made of a metal material having relatively high thermal conductivity (e.g., aluminum alloys), for example. The heat transfer member 19 can be made of a resin material containing silicon carbide having relatively high thermal conductivity and formed in a sheet shape or can be formed in a flat bag shape including gel having relatively high thermal conductivity, for example. The heat transfer member 19 can have flexibility and elasticity. The element 20 can be a NAND type flash memory (a memory, a storage, or a storage device), for example.

In the embodiment, as exemplarily illustrated in FIG. 6, the heat transfer members 18 and 19 press a plurality of elements 20 provided (mounted) on the surface 12a of the board 12. As a result, according to the embodiment, the number of pressing parts or manufacturing time of the parts is readily reduced than in the case where a heat transfer member is provided for each element 20, for example. When the elements 20 are provided in plurality, the positions (the heights from the surface 12a of the board 12) of top portions 20a (the edges or surfaces away from the surface 12a of the board 12) of the elements 20 may vary or tilt due to differences in the elements 20, positional shifts in mounting the elements 20 on the board 12, or variation in the adhesive (e.g., solder) amount, for example. In this embodiment, however, gaps between the heat transfer member 19 and the top portions 20a of the elements 20 are readily reduced because the heat transfer member 19, which has flexibility and relatively high softness and is readily deformed, is placed on the elements 20, for example. That is, according to the embodiment, the heat transfer member 19 more readily follows the variations of the top portions 20a of the elements 20 so as to reduce the gap therebetween, for example. As a result, according to the embodiment, the heat transfer member 19 and the top portions 20a of the elements 20 more readily make contact with each other, thereby readily further enhancing thermal conductivity therebetween, for example. In the embodiment, a plurality of lines of the elements 20 (in the embodiment, e.g., two lines) are provided along the longitudinal direction of the heat transfer members 18 and 19, and each line is composed of a plurality of elements 20 (in the embodiment, e.g., four elements 20), for example.

In the embodiment, as exemplarily illustrated in FIGS. 3 to 10, the pressing member 11 comprises fixing portions 11a, a pressing portion 11b, and arms 11c, for example. Each fixing portion 11a (a base, a joint portion, an attaching portion, or a second fixing portion) is jointed (fixed) to the stud 16 at a position located off the heat transfer members 18 and 19, which are the components pressed by the pressing member 11, in the plan view of the board 12. The structure of the stud 16 is the same as that used for jointing (fixing) the pressing member 10. In the embodiment, as exemplarily illustrated in FIGS. 3 to 6, the studs 16 used for jointing (fixing) the pressing member 10 are also used for jointing the pressing member 11. Specifically, each fixing portion 11a is provided with an opening 11d (a through hole or a notch, in the embodiment, e.g., a through hole, refer to FIGS. 5 to 8). The jointing member 17A (in the embodiment, e.g., a screw), which passes through the openings 10d and 11d, is jointed to the joint 16a (in the embodiment, e.g., the female screw) of the stud 16. As a result, the fixing portion 11a together with the fixing portion 10a is fixed to the edge, which is away from the surface 12a, of the joint 16a of the stud 16. That is, according to the embodiment, the number of fixing parts or manufacturing time of the parts is readily reduced, for example, because the studs 16 are used commonly for jointing (fixing) the pressing members 10 and 11, for example.

In the embodiment, a plurality of fixing portions 11a (in the embodiment, e.g., two fixing portions 11a) are positioned near a plurality of respective corners 18a (in the embodiment, e.g., two corners 18a) of the heat transfer member 18, for example. All of the fixing portions 11a are positioned on one side of the heat transfer member 18 in the plan view of the surface 12a of the board 12. Specifically, the fixing portions 11a are positioned in an area on one side of a center line C2 extending along the longitudinal direction of the heat transfer member 18. The fixing portions 11a are positioned in an area outside an edge 18b (an edge, in the embodiment. e.g., the edge 18b disposed along the longitudinal direction) or the extension of the edge 18b (the opposite side of the edge 18b with respect to the heat transfer member 18). The arms 11c, which connect to the respective fixing portions 11a and extend from the respective fixing portions 11a, extend from one side toward the other side of the heat transfer member 18 in relation to the center line C2 (in the sideways direction of the heat transfer member 18). In the embodiment, the pressing member 11 is supported by the board 12 (the housing 3A) on one side near the heat transfer member 18 and the elements 20 in a cantilever fashion as viewed along the center line C2 and the surface 12a of the board 12, for example.

In the embodiment, as exemplarily illustrated in FIGS. 4 and 7 to 9, each arm 11c extends between the fixing portion 11a and the pressing portion 11b so as to connect to them. The arm 11c has a belt-like platy shape. In the embodiment, as exemplarily illustrated in FIGS. 7 to 9, each arm 11c comprises a bent portion 11f between the fixing portion 11a and the pressing portion 11b.

In the embodiment, as exemplarily illustrated in FIGS. 4 and 6, the pressing portion 11b is positioned opposite the heat transfer member 19 with respect to the heat transfer member 18, and further positioned opposite the element 20 with respect to the heat transfer member 18 and 19. That is, the pressing portion 11*b* overlaps with the board 12, the heat transfer members 18 and 19, and the elements 20 in the thickness direction of the board 12. The pressing portion 10*b* covers the central area C1 of an area in which the heat transfer members 18 and 19, and the elements 20 are positioned, in the plan view of the surface 12*a* of the board 12. The pressing portion lib has a quadrangular shape (in the embodiment, e.g., a rectangular shape) in the plan view. The pressing portion lib has a platy shape. The pressing portion lib is provided with openings 11*e* (through holes or notches, in the embodiment, e.g., through holes). Projections 18*c* provided on the heat transfer member 18 are inserted into the openings 11*e*. As a result, the pressing member 11 and the heat transfer member 18 are positioned. The projections 18*c* and the pressing member 11 can be jointed by swaging (deforming) portions, which are inserted into the openings 11*e*, of the projections 18*c*.

Figure 8:
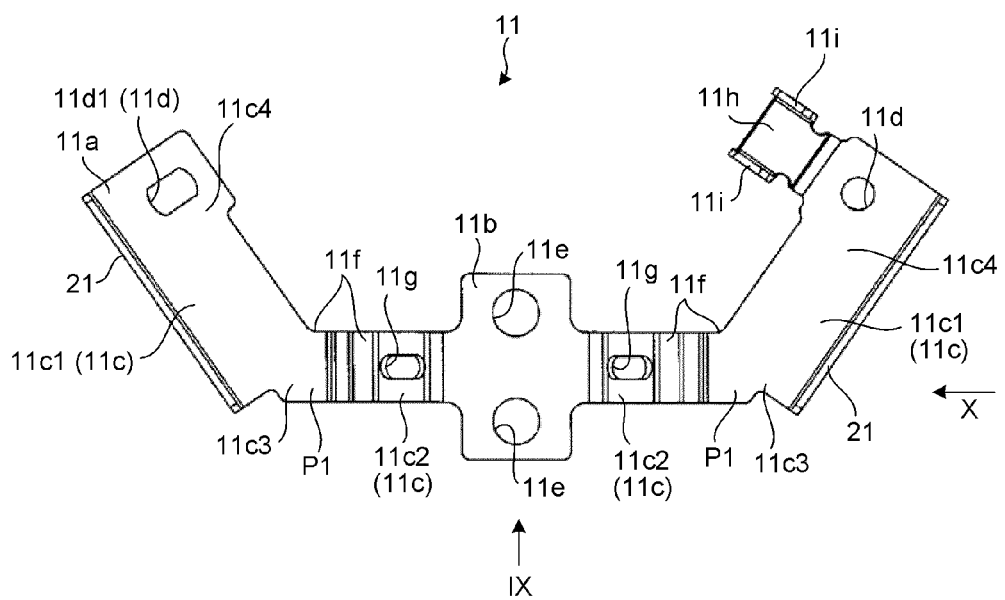
FIG. 8 is an exemplary plan view of the pressing member of FIG. 7, in the first embodiment.
Figure 9:
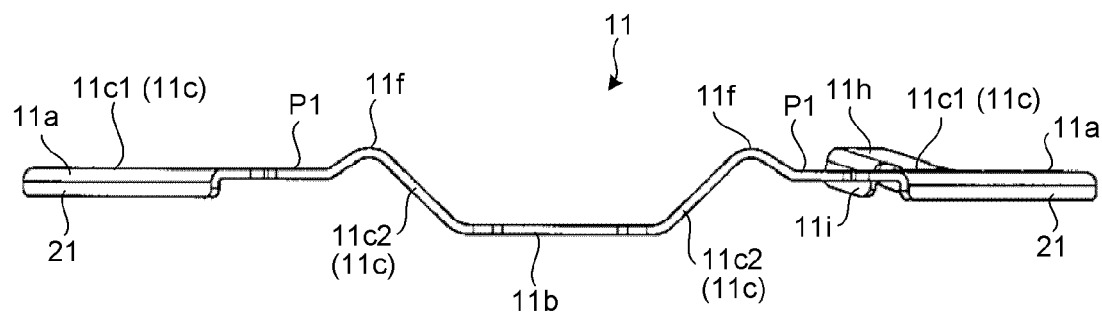
FIG. 9 is an exemplary side view of the pressing member of FIG. 7 as viewed from direction IX of FIG. 8, in the first embodiment.
Figure 10:
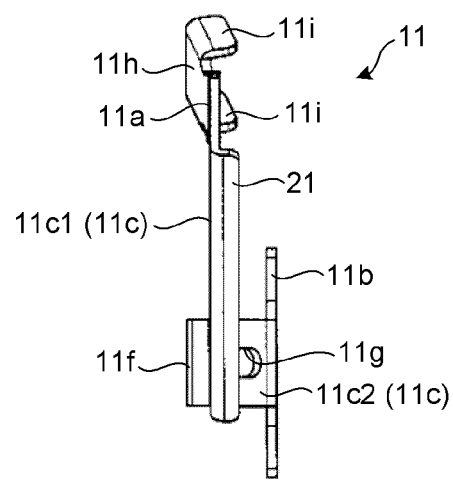
FIG. 10 is an exemplary side view of the pressing member of FIG. 7 as viewed from direction X of FIG. 8, in the first embodiment.

In the embodiment, as exemplarily illustrated in FIGS. 4 and 8, each arm 11*c* is bent at a position P1 (a middle point or a bent portion) on the center line C2. A second portion 11*c*2, which is located closer to the pressing portion lib than the position P1 in each arm 11*c*, extends along the center line C2. A plurality of positions P1 (in the embodiment, e.g., two positions P1) are positioned opposite the element 20 (board 12) with respect to the heat transfer member 18. That is, the board 12, the heat transfer member 18, and the positions P1 of the pressing member 11 overlap with each other in the thickness direction of the board 12 (in a direction normal to the surface 12*a* of the board 12 or in a direction (overlapping direction) in which the elements 20 and the heat transfer member 18 overlap with each other on the surface 12*a* of the board 12). The positions P1 and the pressing portion lib are arranged along and nearly on the center line C2. The positions P1 are positioned on both sides of the central area C1 (the central area in the plan view of the surface 12*a* of the board 12) of the heat transfer member 18 so as to interpose the central area C1 therebetween. Furthermore, the positions P1 are positioned so as to be symmetric to each other with respect to the central area C1. A first portion 11*c*1, which is located closer to the fixing portion 11*a* than the position P1 in each arm 11*c*, extends from the fixing portion 11*a* in an oblique direction with respect to the longitudinal and the sideways directions of the heat transfer member 18. That is, the first portion 11*c*1 of the arm 11*c* comes close to the heat transfer member 18 in the longitudinal and the sideways directions of the heat transfer member 18 as it extends from the fixing portion 11*a* toward the position P1.

Figure 7:
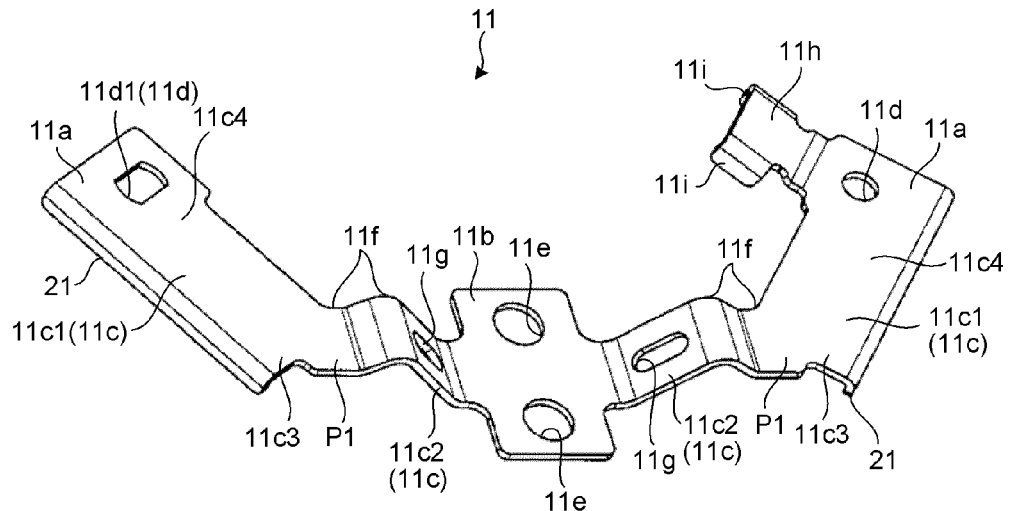
FIG. 7 is an exemplary perspective view of a pressing member comprised in the television receiver in the first embodiment.

In the embodiment, as exemplarily illustrated in FIGS. 3, 4, and 7, the first portion 11*c*1 of each arm 11*c* is provided with a reinforcement 21, for example. Specifically, the reinforcement 21 is bent in a direction intersecting a belt-like shape (a platy shape) portion at an edge of the first portion 11*c*1 in the width direction thereof (in the embodiment, e.g., in a direction perpendicular to the edge) and extends at a nearly constant height as a wall or a protrusion. The reinforcement 21 comprises a portion extended between the fixing portion 11*a* and the position P1, and positioned away from the stud 16 to which the fixing portion 11*a* is fixed. The reinforcement 21 is provided along the longitudinal direction of the first portion 11*c*1 so as to correspond to almost the entire area of the first portion 11*c*1, i.e., between the fixing portion 11*a* and the position P1. The reinforcement 21 crosses the center line C2 of the heat transfer member 18 in the vicinity of the position P1. The reinforcement 21 protrudes toward the board 12. The reinforcement 21 is an example of a suppressing portion that prevents the arm 11*c* (the first portion 11*c*1) from being tilted, displaced, moved, or deformed.

In the embodiment, the reinforcement 21 is provided to the first portion 11*c*1 of the arm 11*c*, for example, as described above. As a result, the second portions 11*c*2 of the arm 11*c* are mainly elastically deformed when the pressing member 11 is attached to the studs 16 and the heat transfer member 18, for example in the embodiment. Specifically, each second portion 11*c*2 is elastically deformed in such a way that a distance between an end portion 11*c*3 (a second end portion) located near the position P1 and an end portion 11*c*4 (a first end portion) located near the pressing portion 11*b* of the second portion 11*c*2 in the thickness direction of the board 12 (the direction perpendicular to FIG. 4 or the Z direction) is shorter than that in a free state (when the pressing member 11 is not attached to the studs 16 and the heat transfer member 18). That is, the second portions 11*c*2 are bent in a convex shape toward the surface 12*a* of the board 12. As a result, pressing force (elastic force or repulsive force) generated by the elastic deformation of the arms 11*c* acts on the heat transfer members 18 and 19 and the elements 20, for example, from the pressing portion 11*b*.

Hence, in the embodiment, the same state can be achieved as when the end portion of the second portion 11*c*2, which is the elastically deformed portion in the arm 11*c*, is supported at the position P1 instead of the fixing portion 11*a*, for example. This state allows the pressing member 11 to readily generate more effective or proper pressing force (e.g., a proper magnitude and a proper direction) regardless of a relative positional relationship among the components such as the elements 20 and the heat transfer members 18 and 19, and the fixing portions 11*a* and the studs 16, for example. In addition, flexibility of the layout of the components such as the elements 20 and the heat transfer members 18 and 19, and the fixing portions 11*a* and the studs 16 is readily increased, for example. That is, components are readily more efficiently arranged.

In the embodiment, as exemplarily illustrated in FIGS. 3, 4, 7, and 9, one of the fixing portions 11*a* (the fixing portion 11*a* illustrated on the right side in FIGS. 4 and 7) of the pressing member 11 comprises a protrusion 11*h* that protrudes along the arm 10*c* of the pressing member 10. The protrusion 11*h* overlaps with the arm 10*c* in the thickness direction of the board 12. The protrusion 11*h* is provided with hooks 11*i* (walls) on both edges (both edge portions) in the sideways direction thereof so as to cover the edge (edge portion, in the embodiment, e.g., both edges) in the sideways direction of the arm 10*c*. Each hook 11*i* is bent in a direction intersecting the belt-like shaped (a platy shape) edge of the protrusion 11*h* in the sideways direction (in the embodiment, e.g., in a direction perpendicular to the edge) and protrudes toward the arm 10*c*. The hooks 11*i* are examples of a positioning portion between the pressing members 10 and 11. As illustrated in FIG. 7, an opening 11*d*1 disposed on the fixing portion 11*a* illustrated on the left side in FIG. 7 has an elongate hole shape, which is long in a direction intersecting (in the embodiment, e.g., a direction perpendicular to) the extending direction of the first portion 11*c*1 of the arm 11*c* extending to the fixing portion 11*a*. As a result, the pressing member 11 is readily deformed in the long direction of the opening 11*d*1 as a whole. In this regard, in the embodiment, the hooks 11*i* and the arm 10*c* make contact in the long direction of the opening 11*d*1, for example. As a result, the displacement of the pressing member 11 is readily suppressed. That is, the hooks 11*i* are examples of the positioning portions. The effect of positioning the pressing members 10 and 11 and suppressing the position shift therebetween through contact between the hooks 11*i* and the arm 10*c* appears when the pressing members 10 and 11 are temporally assembled prior to using the jointing members 17A and after the pressing members 10 and 11 are assembled, for example.

In the embodiment, as exemplarily illustrated in FIGS. 7 and 8, the second portion 11c2 of each arm 11c is provided with an opening 11g (a through hole or a notch, in the embodiment, e.g., a through hole). The opening 11g enables the elasticity of the second portion 11c2 of the arm 11c to be reduced, for example. As a result, pressing force generated by the pressing member 11 can be reduced, for example. For another example, a bending amount of the second portion 11c2 of the arm 11c can be increased.

In the embodiment, a plurality of components (elements, electronic components, or electrical components) are housed inside the housing 3A in addition to the elements 15 and 20, for example. The elements 15 and 20 and other components mounted on the board 12 format least a portion of a control circuit (not illustrated). The control circuit can comprise a video signal processing circuit, a tuner, a high-definition multimedia interface (HMDI) signal processor, an audio video (AV) input terminal, a remote controller signal receiver, a controller, a selector, anon screen display interface, a storage such as a read only memory (ROM), a random access memory (RAM), a hard disk drive (HDD), and a voice signal processing circuit. The control circuit controls output of images (moving images and still images) on the display screen 4a of the display 4, output of sound from speakers (not illustrated), and light emission of light emitting diodes (LEDs) (not illustrated). The display 4, the speakers, and the LEDs are examples of an output module.

As described above, in the embodiment, the pressing member 11 comprises two reinforcements 21 provided to the respective arms 11c, for example. The reinforcement 21 of each arm 11c comprises a portion extended between the fixing portion 11a and the position P1, which is located between the fixing portion 11a and the pressing portion 11b, and positioned away from the stud 16. That is, in the embodiment, the fixing portion 11a and the second portion 11c2, which is mainly elastically deformed in the arm 11c, can be separated. As a result, the influence due to the positions of the studs 16 (the fixing portions 11a) on the pressing force of the pressing member 11 is readily further reduced, for example. Hence, the pressing member 11 readily generates a more effective or proper pressing force (e.g., a proper magnitude and a proper direction), for example. As a result, flexibility of the layout of the studs 16 is readily increased, for example. Consequently, flexibility of the layout of the components inside the housing 3A is readily increased, for example.

In the embodiment, the two studs 16 to which the pressing member 11 is fixed are positioned on one side of the heat transfer member 18, for example. As a result, according to the embodiment, the size of the pressing member 11 can be further reduced than when the studs 16 are positioned on both sides, respectively, of the heat transfer member 18, for example. As another example, the compact pressing member 11 allows the other components to be readily arranged, thereby readily increasing the mounting density of the components. As a result, the sizes of the housing 3A and the television receiver 1A are readily reduced, for example.

In the embodiment, the positions P1 are positioned opposite the heat transfer member 19 and the elements 20 with respect to the heat transfer member 18, for example. According to the embodiment, larger pressing force is readily achieved than when the positions P1 are provided off the heat transfer member 18, for example.

In the embodiment, the positions P1 of the two arms 11c are positioned on both sides, respectively, of the pressing portion 10b so as to interpose therebetween the pressing portion 10b, for example. As a result, according to the embodiment, pressing force generated by the elastic deformations of the two arms 11c is readily suppressed from unequally acting on the heat transfer member 18, for example.

In the embodiment, the positions P1 of the two arms 11c and the pressing portion 11b are arranged along the longitudinal direction of the heat transfer member 18 as viewed in the overlapping direction of the heat transfer members 18 and 19, the elements 20, and the board 12 (in the plan view), for example. As a result, according to the embodiment, the pressing member 11 can be positioned in an area overlapping with the disposition area of the heat transfer members 18 and 19 and the elements 20 (a dead space) by effectively utilizing the area, for example. This arrangement can further reduce a component of the pressing member 11 positioned outside the heat transfer member 18 in the plan view, for example. As a result, the components are readily arranged in an efficient layout.

In the embodiment, the positions P1 of the two arms 11c and the pressing portion 11b are arranged on the center line C2 of the heat transfer member 18 as viewed in the overlapping direction of the heat transfer members 18 and 19, the elements 20, and the board 12 (in the plan view), for example. As a result, according to the embodiment, pressing force generated by the elastic deformations of the two arms 11c is readily suppressed from unequally acting on the heat transfer member 18, for example.

In the embodiment, as illustrated in FIG. 7, each reinforcement 21 extends between the end portion 11c4 (the first end portion) located near the fixing portion 11a of the first portion 11c1 and the end portion 11c3 (the second end portion), which is located opposite the fixing portion 11a and beyond the centerline C2, in the overlapping direction of the heat transfer members 18 and 19, the elements 20, and the board 12 (in the plan view), for example. As a result, according to the embodiment, the stiffness of the first portion 11c1 is readily further increased than when the reinforcement 21 does not extend between the end portions 11c4 and 11c3, for example.

In the embodiment, each arm 11c is bent at the position P1, for example. As a result, according to the embodiment, flexibility of the layout of the studs 16 (the fixing portions 11a) is readily further increased than when the arms 11c are straight, for example. Consequently, the components are readily arranged in an efficient layout.

In the embodiment, the cross-sectional surface of the first portion 11c1 having the reinforcement 21 of each arm 11c in a direction intersecting the extending direction of the first portion 11c1 has a bent shape, for example. As a result, according to the embodiment, the reinforcement 21 provided to the first portion 11c1 further increases the moment of inertia of the first portion 11c1 and the stiffness of the first portion 11c1 is readily increased, for example.

In the embodiment, the reinforcement 21 is formed as the protrusion along the first portion 11c1 of each arm 11c, for example. As a result, according to the embodiment, the first portion 11c1 can be reinforced by a relatively simple structure, for example.

An electronic device 1B according to a second embodiment is a so-called laptop computer, for example. In the second embodiment, as exemplarily illustrated in FIG. 11, the electronic device 1B comprises a first housing 3B (a housing) and a second housing 2B (another housing). The first housing 3B (a first portion) houses the board 12 (refer to FIG. 12). The second housing 2B (a second portion) houses at least a portion of the display 4. The first housing 3B is provided with a keyboard 6 (an input operation module, an input reception module, or an input module), a touch pad 7 (an input operation module, an input reception module, or an input module), and click buttons 8 (input operation modules, input reception modules, or input modules), for example.

The first housing 3B and the second housing 2B are rotatably connected by hinges 9 (connection portions, joint portions, rotation supports, hinge mechanisms, connection mechanisms, joint mechanisms, or rotation support mechanisms). The first housing 3B and the second housing 2B are rotatably connected by the hinges 9, whereby the laptop can be changed between at least an opened state illustrated in FIG. 11 and a folded state, which is not illustrated. In the embodiment, the hinges 9 connect the first housing 3B and the second housing 2B rotatably about a rotation axis Ax, for example. The display screen 4*a* of the display 4 is exposed from an opening 2*r* disposed on a surface 2*a* (a front, a surface, or a surface portion) of the second housing 2B. The keyboard 6, the touch pad 7, and the click buttons 8 are exposed on a surface 3*a* (an upper surface, a front, a first surface, or a first surface portion) of the first housing 3B. In the folded state, the surface 3*a* of the first housing 3B and the surface 2*a* of the second housing 2B cover each other, so that the display screen 4*a*, the keyboard 6, the touch pad 7, and the click buttons 8 are hidden by the first housing 3B and the second housing 2B. In the opened state, the surface 3*a* of the first housing 3B and the surface 2*a* of the second housing 2B are exposed, so that the display screen 4*a*, the keyboard 6, the touch pad 7, and the click buttons 8 are usable (can be viewed or operated).

Figure 11:
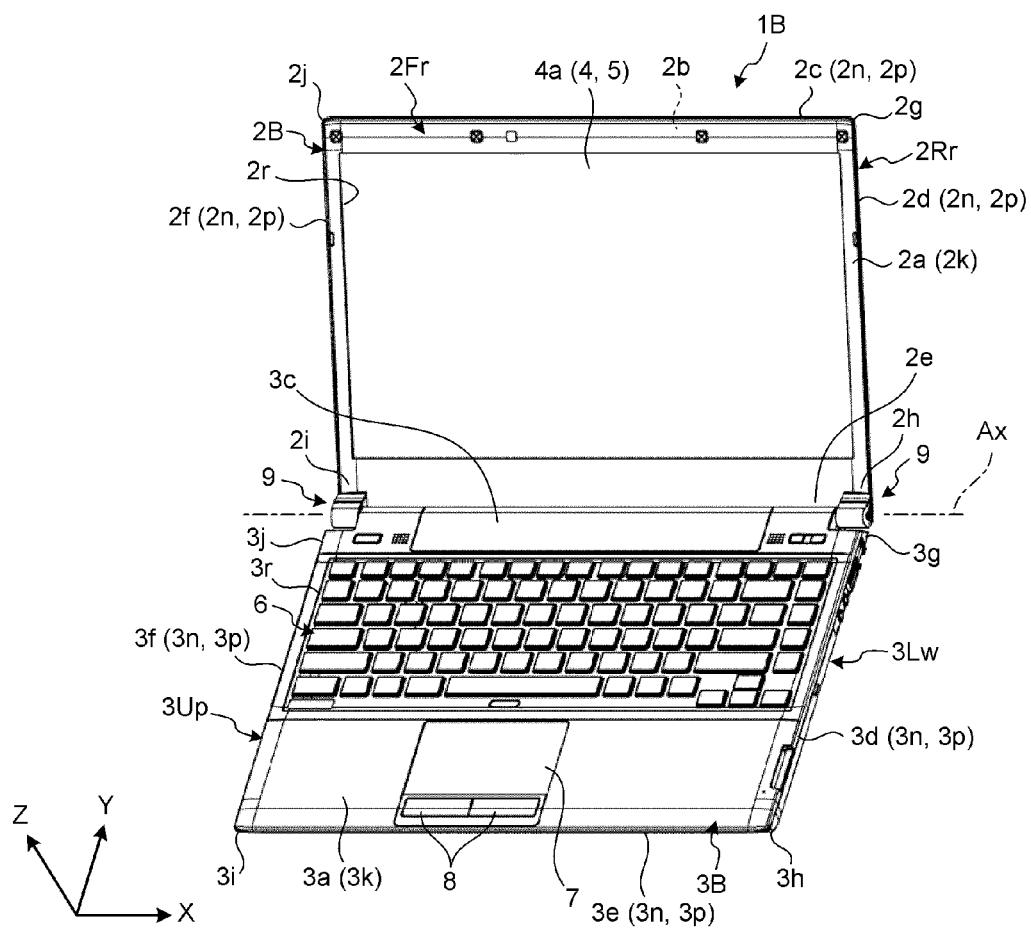
FIG. 11 is an exemplary perspective view of an electronic device according to a second embodiment.

In the embodiment, as exemplarily illustrated in FIG. 11, the second housing 2B has a rectangular shape (in the embodiment, e.g., an oblong shape) as viewed from the front and rear. In the embodiment, the second housing 2B is formed in a thin and flat rectangular parallelepiped shape in the front-back direction (the thickness direction of the second housing 2B), for example. The second housing 2B has the surface 2*a* and a surface 2*b* (a rear, a rear surface, or a surface portion) opposite the surface 2*a*. The surfaces 2*a* and 2*b* are provided so as to extend in the same direction of each other (in the embodiment, e.g., in parallel with each other). The second housing 2B has four edges 2*c* to 2*f* (sides or frames) and four corners 2*g* to 2*j* (sharp edges, bent portions, or edges) as viewed from the front. The edges 2*c* and 2*e* are examples of the long side. The edges 2*d* and 2*f* are examples of the short side.

The second housing 2B comprises a wall 2*k* (a portion, a plate, a frame, a front wall, a frontward wall, or a ceiling wall) comprising the surface 2*a*, and a wall 2*m* (a portion, a plate, a back wall, a backward wall, or a bottom wall) comprising the surface 2*b*. The walls 2*k* and 2*m* have rectangular shapes (in the embodiment, e.g., oblong shapes). The wall 2*k* has a frame shape while the wall 2*m* has a platy shape. The second housing 2B comprises four walls 2*n* (portions, plates, side walls, edge walls, upright walls, or extending portions) comprising a surface 2*p* (a side surface or a surrounding surface) that extends between the walls 2*k* and 2*m*. The wall 2*k* is provided with the opening 2*r* having a rectangular shape.

The second housing 2B is configured by combining a plurality of parts (divided bodies or members). For example, the second housing 2B comprises a first member 2Fr (a first portion, a front side member, a cover, a bezel, or a frame) comprising at least the wall 2*k*, and a second member 2Rr (a second portion, a back side member, a base, a bottom, a plate, or a cover) comprising at least the wall 2*m*. In the embodiment, the walls 2*n* are configured as a part of the second member 2Rr, for example. The first member 2Fr and the second member 2Rr can be made of a metal material or a synthetic resin material, for example.

In the embodiment, the second housing 2B houses the display 4 (the display portion, the display, the panel, or the display part), for example. Specifically, the display screen 4*a*, which is located on a side adjacent to the surface 2*a* of the display 4 is exposed from the opening 2*r* in a forward (outward) direction from the second housing 2B. A user can view the display screen 4*a* through the opening 2*r* from the front. The display 4 has a rectangular shape (in the embodiment, e.g., an oblong shape) as viewed from the front. The display 4 is formed in a thin and flat rectangular parallelepiped shape in the front-back direction. The display 4 may be a liquid crystal display (LCD), an organic electroluminescent display (OLED), or a plasma display panel (PDP), for example.

In the embodiment, the input operation panel 5 (e.g., a touch panel, a touch sensor, an operation surface, an input operation module, or an input reception module), which is transparent and has a relatively thin and rectangular shape, is provided on a front side (a frontward side or a side adjacent to the wall 2*k*), for example. The input operation panel 5 covers the display screen 4*a*. An operator (or a user) can perform input processing by operation such as touching, pressing, and rubbing the input operation panel 5 with fingers or a stylus, or moving fingers or the stylus near the input operation panel 5, for example. Light emitted from the display screen 4*a* of the display 4 passes through the input operation panel 5 and travels in the forward (outward) direction from the second housing 2B through the opening 2*r* disposed on the wall 2*k*. The input operation panel 5 is an example of the input module. In the embodiment, the display 4 and the input operation panel 5 are fixed to either the first member 2Fr or the second member 2Rr with fixtures (fixing parts or clasps such as screws, clasps, and parts, which are not illustrated) or an adhesive portion (such as adhesive or a double-sided adhesive tape, which is not illustrated), for example.

On the other hand, in the embodiment, as exemplarily illustrated in FIG. 11, the first housing 3B has a rectangular shape (in the embodiment, e.g., an oblong shape) as viewed from the front and rear. In the embodiment, the first housing 3B is formed in a thin and flat rectangular parallelepiped shape in the upper-lower direction (the thickness direction of the first housing 3B or the Z direction), for example. The first housing 3B has the surface 2*a* (the upper surface, the front surface, or the surface portion) and the surface 2*b* (the lower surface, the rear surface, or the surface portion) opposite the surface 2*a*. The surfaces 2*a* and 2*b* are provided so as to extend in the same direction (in the embodiment, e.g., in parallel with each other). As illustrated in FIG. 11, the first housing 3B has four edges 3*c* to 3*f* (sides or frames) and four corners 3*g* to 3*j* (sharp edges, bent portions, or edges) in the plan view. The edges 3*c* and 3*e* are examples of the long side. The edges 3*d* and 3*f* are examples of the short side. The first housing 3B can function as a container portion housing components 22 (refer to FIG. 12) and also can function as a supporter supporting heavy weight components (parts), for example.

The first housing 3B comprises a wall 3*k* (a portion, a plate, a frame, an upper wall, a frontward wall, or a ceiling wall) comprising the surface 3*a*, and a wall 3*m* (a portion, a plate, a lower wall, a backward wall, or a bottom wall) comprising the surface 3*b*. The walls 3*k* and 3*m* have rectangular shapes (in the embodiment, e.g., oblong shapes). The wall 3*k* has a frame shape while the wall 3*m* has a platy shape. The first housing 3B has four walls 3*n* (portions, plates, side walls, edge walls, upright walls, or extending portions) comprising a surface 3*p* (a side surface or a surrounding surface) that extends between the walls 3*k* and 3*m*. The wall 3*k* is provided with an opening 3*r* having a rectangular shape.

The first housing 3B is configured by combining a plurality of parts (divided bodies or members). For example, the first housing 3B comprises a first member 3Up (a first portion, an upper side member, a cover, a mask, or a plate) comprising at least the wall 3k, and a second member 3Lw (a second portion, a lower side member, a base, a bottom, a plate, or a cover) comprising at least the wall 3m. In the embodiment, the walls 3n are structured as a part of the second member 3Lw, for example. Besides the first member 3Up and the second member 3Lw, the first housing 3B can comprise a third member (a third portion, an intermediate member, an inner member, a middle frame, or a middle plate) interposed between the first member 3Up and the second member 3Lw. A part of the third member can include parts of the walls 3k, 3m, and 3n. The first member 3Up, the second member 3Lw, and the third member can be made of a metal material or a synthetic resin material, for example.

Figure 12:
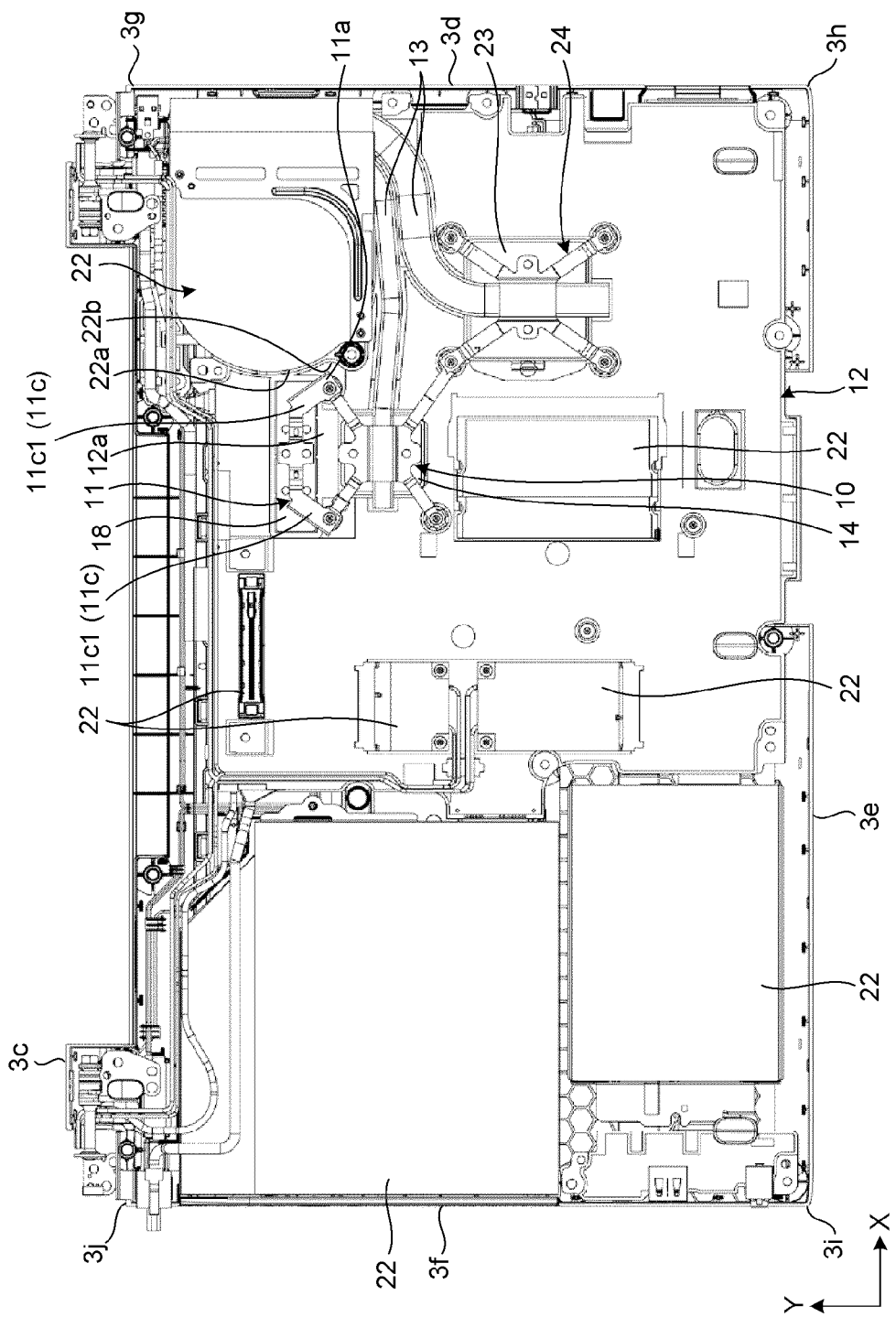
FIG. 12 is an exemplary plan view of an internal structure of a first housing of the electronic device in the second embodiment.

In the embodiment, as exemplarily illustrated in FIG. 12, one or more boards 12 (the circuit boards, the control boards, the main boards, or the electrical components) are housed inside the first housing 3B. The boards 12 are provided so as to extend in the same direction as that of the keyboard 6 (refer to FIG. 11) (in the embodiment, e.g., in parallel with each other), for example.

In the embodiment, as exemplarily illustrated in FIGS. 12 to 16, pressing members 10 and 11 are provided inside the first housing 3B. Specifically, as illustrated in FIG. 12, the pressing member 10 is formed in an X shape and the pressing member 11 is formed in a V shape in the plan view of the surface 12a of the board 12. The pressing members 10 and 11 have the same configurations as those of the pressing members 10 and 11 included in the television receiver 1A according to the first embodiment, respectively. Therefore, the detailed descriptions of the pressing members 10 and 11 and the structures related to the pressing members 10 and 11 are omitted in the embodiment. In addition, a pressing member 24 is provided inside the first housing 3B. The pressing member 24 has a structure similar to that of the pressing member 10 and presses the heat pipe 13, a heat transfer member 23, and an element (a component, an electronic component, a chip, a package, a semiconductor component, or a second component), which is not illustrated.

Figure 13:
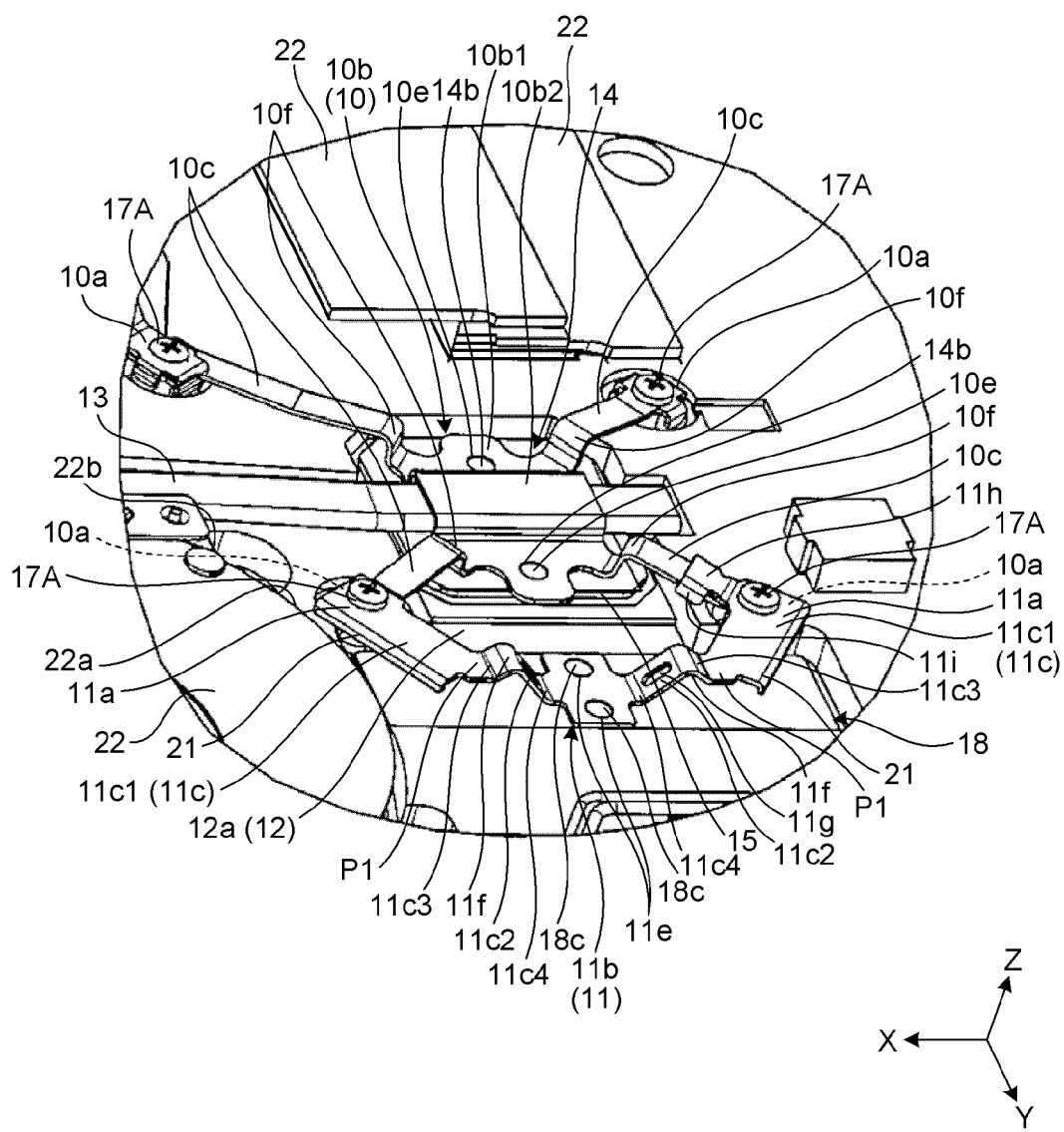
FIG. 13 is an exemplary perspective view of the internal structure of the electronic device in the second embodiment.
Figure 14:
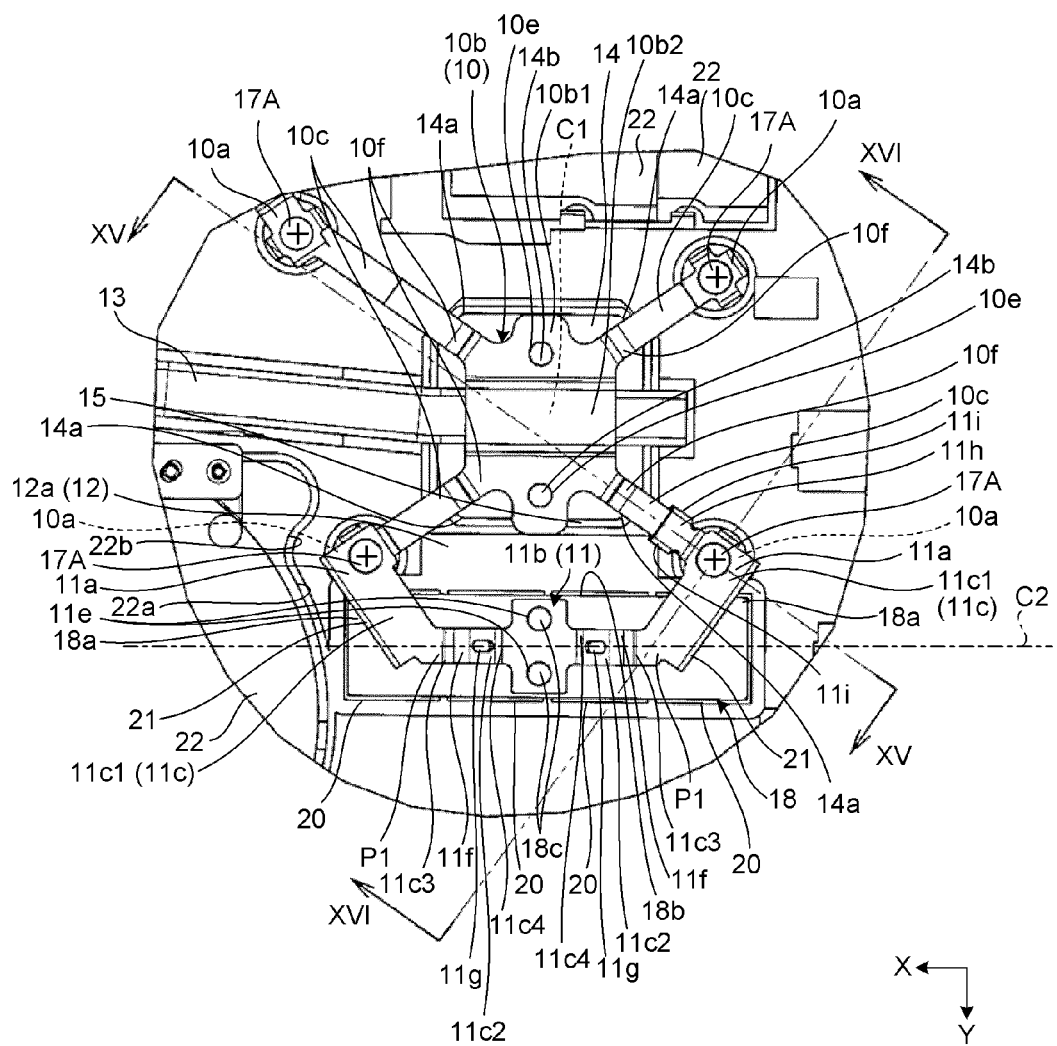
FIG. 14 is an exemplary plan view of the internal structure of the electronic device in the second embodiment.
Figure 15:
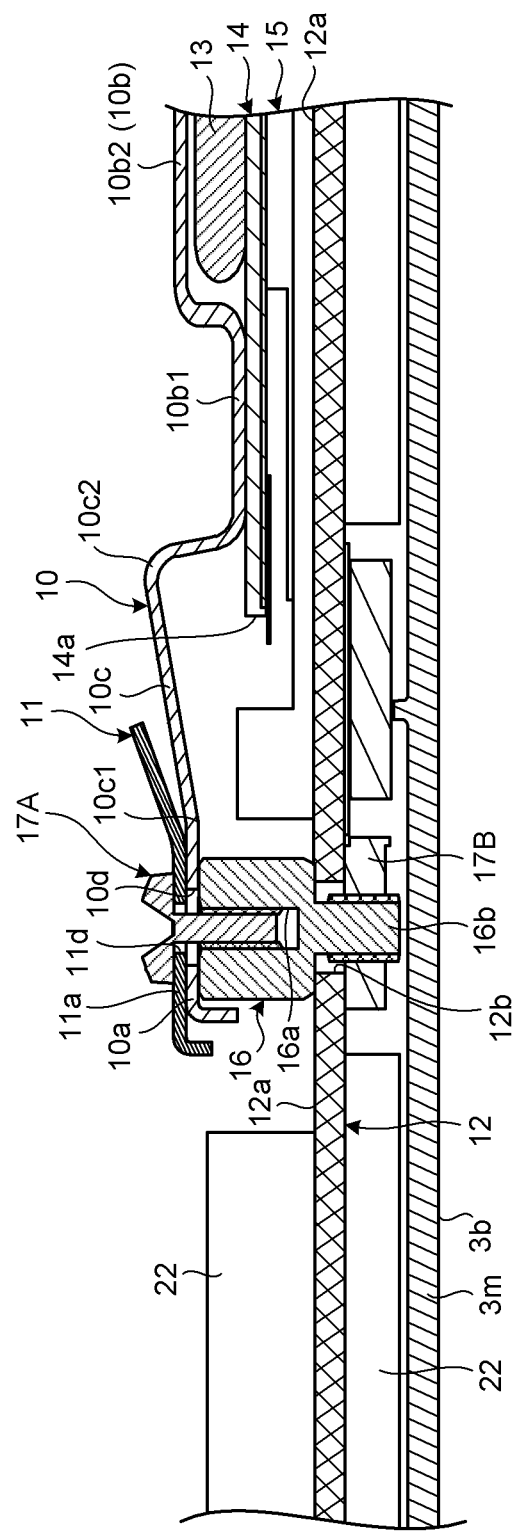
FIG. 15 is an exemplary cross sectional view taken along line XV-XV of FIG. 14, in the second embodiment.
Figure 16:
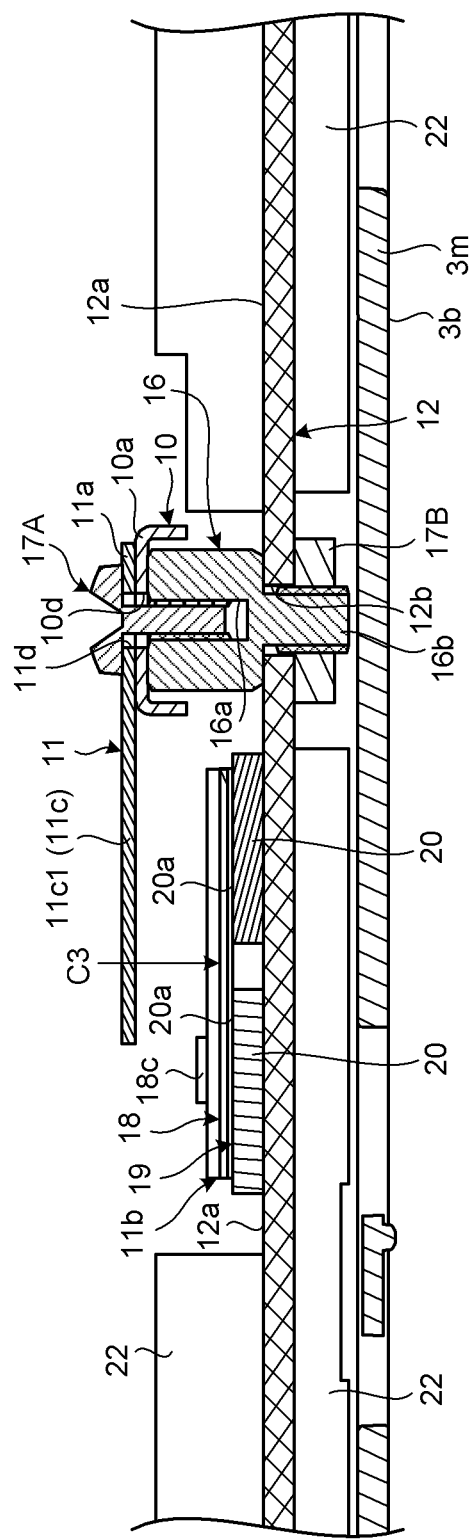
FIG. 16 is an exemplary cross sectional view taken along line XVI-XVI of FIG. 14, in the second embodiment.

As illustrated in FIGS. 12 to 14, one of the two arms 11c (the first portions 11c1), which is located on the right side in FIG. 12, extends from the corresponding fixing portion 11a along a side wall 22a (a side surface) of the component 22 (in the embodiment, e.g., a fan) or in a direction away from the side wall 22a to avoid interference with the component 22. This configuration enables the pressing member 11, the heat transfer members 18 and 19, and the elements 20 to be positioned closer to the component 22, for example. As a result, flexibility of the layout of the component 22 is further increased, for example. In addition, the fixing portion 11a is provided corresponding to (close to or face) a recessed portion 22b provided on the component 22. As a result, this configuration enables the pressing member 11, the heat transfer members 18 and 19, and the elements 20 to be positioned even closer to the component 22, for example. As a result, flexibility of the layout of the component 22 is furthermore increased, for example.

In the embodiment, on the board 12, a plurality of components 22 can be mounted. Examples of the component 22 include a central processing unit (CPU), a graphic controller, a power source circuit component, a platform controller hub (PCH), a memory slot connector, an LCD connector, an input/output (I/O) connector, a power source coil, an element, and a connector. The control circuit can comprise a video signal processing circuit, a tuner, a high-definition multimedia interface (HMDI) signal processor, an audio video (AV) input terminal, a remote controller signal receiver, a controller, a selector, an on-screen display interface, a storage such as a read only memory (ROM), a random access memory (RAM), a hard disk drive (HDD), or a solid state drive (SSD), and a voice signal processing circuit. The control circuit controls output of images (moving images and still images) on the display screen 4a of the display 4, output of sound from speakers (not illustrated), and light emission of light emitting diodes (LEDs) (not illustrated). The display 4, the speakers, and the LEDs are examples of the output module.

The electronic device 1B in the second embodiment can achieve the same result as the first embodiment because the electronic device 1B comprises the pressing members 10 and 11 and the structures related to the pressing members 10 and 11 in the same manner as those of the television receiver 1A in the first embodiment.

Figure 17:
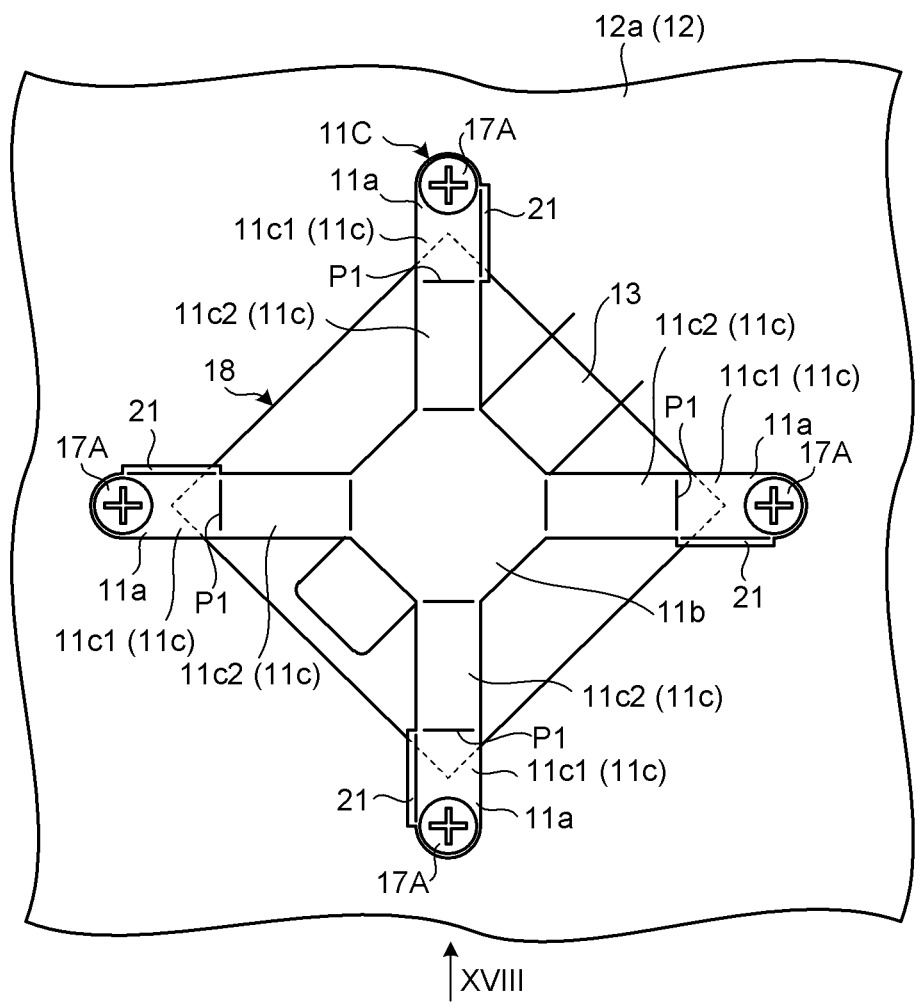
FIG. 17 is an exemplary plan view of an internal structure of the electronic device according to a first modification.
Figure 18:
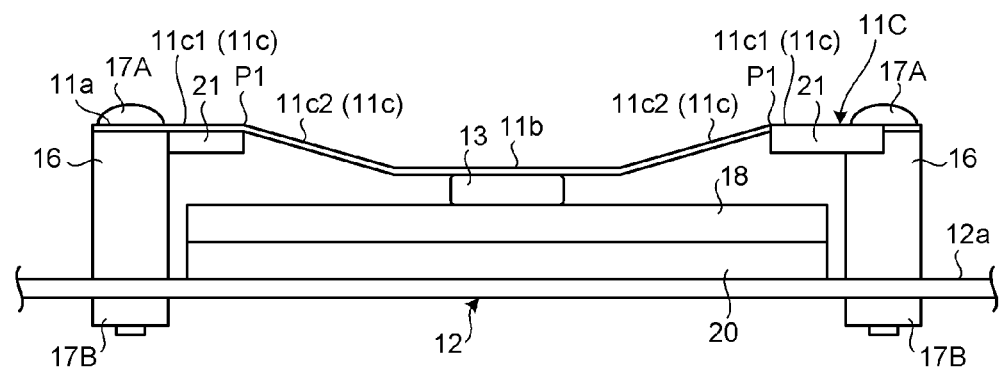
FIG. 18 is an exemplary side view of the internal structure of FIG. 17 as viewed from direction XVIII of FIG. 17, in the first modification.

In a first modification, as exemplarily illustrated in FIGS. 17 and 18, a pressing member 11C has an X shape. The pressing member 11C presses the heat pipe 13 (the component, the cooling component, the cooler, the heat receiver, the heat transfer portion, or the heat dissipator) to the heat transfer member 18 (the component, the heat transfer component, the heat receiver, the heat transfer portion, or the heat dissipator). In addition, the pressing member 11C presses the heat pipe 13 and the heat transfer member 18 (the component) to the element 20 (the component, the electronic component, the chip, the package, the semiconductor component, or the second component). In the modification, the pressing portion 11b has a platy and a square shape (or an octagonal shape).

In the modification, a plurality of fixing portions 11a (in the modification, e.g., four fixing portions 11a) (and the studs 16) are positioned near a plurality of corners 18a (in the modification, e.g., four corners 18a), respectively, for example. Each fixing portion 11a is provided on the corresponding nearest corner 18a positioned opposite the central area C1 in the plan view (viewed as illustrated in FIG. 17) of the heat transfer member 18 and the element 20. The fixing portion 11a is fixed to the stud 16 by the jointing member 17A (in the modification, e.g., a screw). The first portion 11c1 of each arm 11c is provided with the reinforcement 21, which is the same as that as in the first and the second embodiments. The first portion 11c1 extends along the surface 12a of the board 12 (in the same direction as that of the surface 12a or in parallel with the surface 12a). The first portion 11c1 and the second portion 11c2 of the arm 11c extend along a diagonal line of the heat transfer member 18. In the modification, the positions P1 are positioned opposite the element 20 (the board 12) with respect to the heat transfer member 18. That is, the board 12, the heat transfer member 18, and the positions P1 of the pressing member 11C overlap with each other in the thickness direction of the board 12 (in a direction normal to the surface 12a of the board 12 or in a direction in which the element 20 and the heat transfer member 18 overlap with each other on the surface 12a of the board 12). The distance between the second portion 11c2 and the heat transfer member 18 is reduced in side view along the surface 12a of the board 12 (the view is not illustrated) as the second portion 11c2 extends from the position P1 toward the pressing portion 11b in the plan view. In this way, the pressing member 11C according to the modification has the same structure as the pressing member 11 in the first and the second embodiments. As a result, the modification can achieve the same result as the first or the second embodiment on the basis of the same structure, for example.

Figure 19:
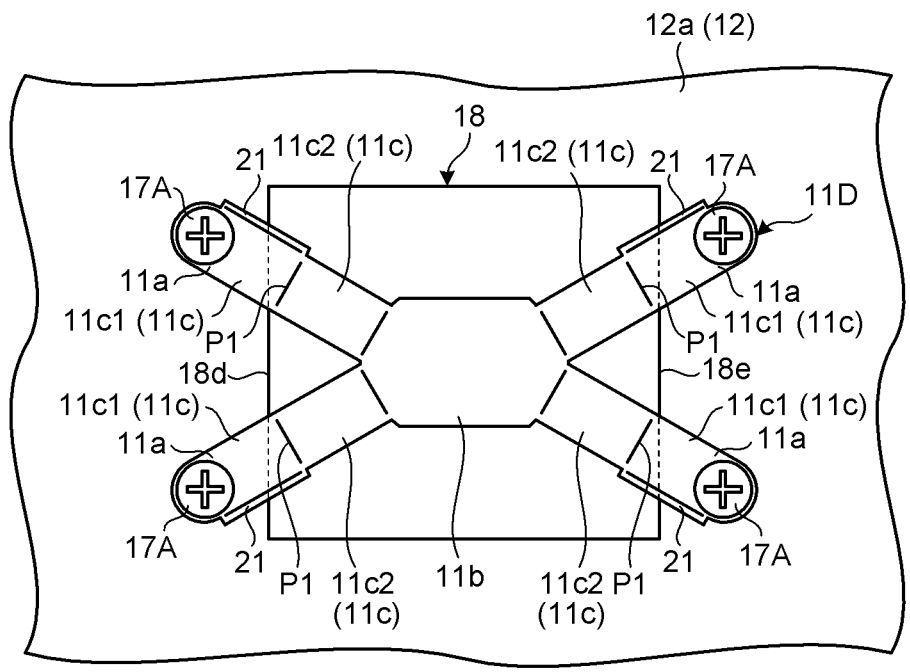
FIG. 19 is an exemplary plan view of an internal structure of the electronic device according to a second modification.

In a second modification, as exemplarily illustrated in FIG. 19, a pressing member 11D has the same configuration as the pressing member 11C in first modification, except for that the positions of the fixing portions 11a and the studs (not illustrated, but located under the fixing portions 11a and on the board 12) and the positions and the extending directions of the arms 11c differ from those of the pressing member 11C, and no heat pipe is included. Specifically, in the modification, the two fixing portions 11a and the studs are positioned so as to face (opposite) an edge 18d, which is one of the edges of the heat transfer member 18, while the other two fixing portions 11a and the studs are positioned so as to face (opposite) an edge 18e, which is located opposite the edge 18d. The modification also can achieve the same results as those of the embodiments and modification 1 on the basis of the same configuration as those of the embodiments and the first modification, for example.

Figure 20:
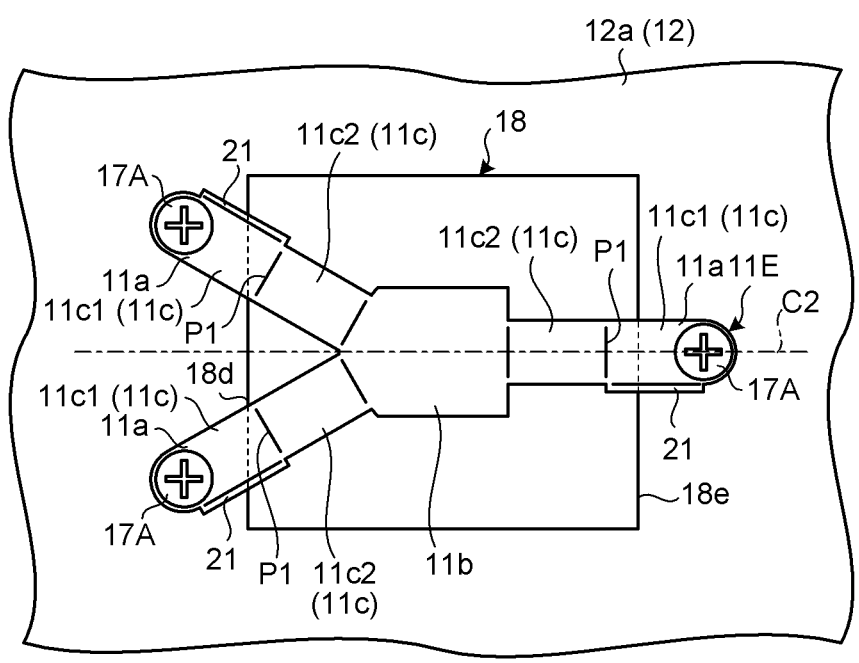
FIG. 20 is an exemplary plan view of an internal structure of the electronic device according to a third modification.

In a third modification, as exemplarily illustrated in FIG. 20, a pressing member 11E has the same configuration as the pressing member 11D in the second modification, except for that the positions of the fixing portions 11a and the studs (not illustrated, but located under the fixing portions 11a and on the board 12) and their number, and the positions and the extending directions of the arms 11c and their number, differ from those of the pressing member 11D. Specifically, in the modification, the pressing member 11E comprises three of each of the fixing portion 11a, the stud, and the arm 11c while the pressing member 11D in the first modification comprises four of each of the fixing portion 11a, the stud, and the arm 11c. The three arms 11c are arranged in a Y shape in the plan view of the surface 12a of the board 12. As apparent from the comparison with FIG. 19 of the second modification, the two arms 11c of the pressing member 11E illustrated on the left side in FIG. 20 are positioned at the same positions and have the same shapes as the two arms 11c of the pressing member 11D illustrated on the left side in FIG. 19. The other arm 11c of the pressing member 11E is positioned on the right side in FIG. 20 so as to face the two arms 11c positioned on the left side. The arm 11c positioned on the right side extends along and on the center line C2 of the heat transfer member 18 and the element (not illustrated, but located under the heat transfer member 18 and on the board 12) in the plan view of the surface 12a of the board 12. The modification also can achieve the same results as those of the embodiments and the second modification on the basis of the same configurations as those of the embodiments and the second modification, for example.

Figure 21:
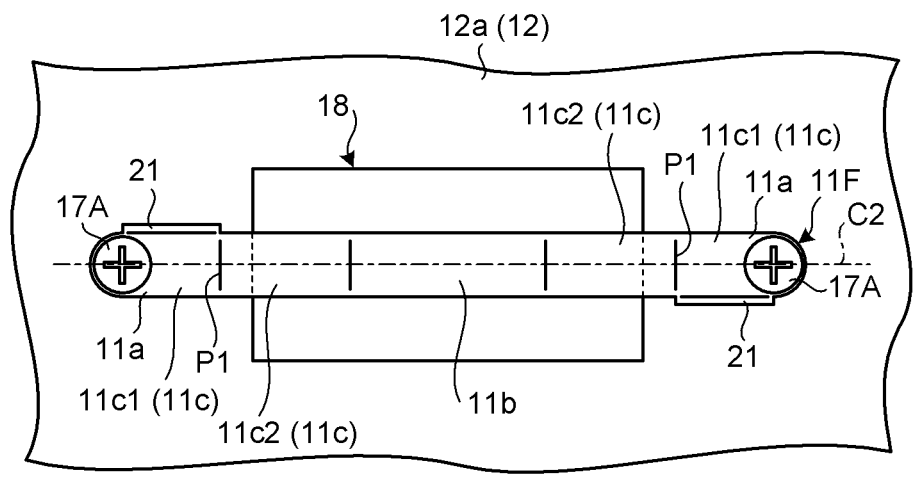
FIG. 21 is an exemplary plan view of an internal structure of the electronic device according to a fourth modification.

In a fourth modification, as exemplarily illustrated in FIG. 21, a pressing member 11F has the same configuration as the pressing member 11E in the third modification except for that the positions of the fixing portions 11a and the studs (not illustrated, but located under the fixing portions 11a and on the board 12) and their number, and the positions and the extending directions of the arms 11c and their number, differ from those of the pressing member 11E. Specifically, in the modification, the pressing member 11F comprises the two arms 11c arranged in an I shape (a straight line shape) in the plan view of the surface 12a of the board 12. The arms 11c and the pressing portion 11b of the pressing member 11F extend on and along the center line C2 of the heat transfer member 18 and the element (not illustrated, but located under the heat transfer member 18 and on the board 12) with a roughly constant width in the plan view of the surface 12a of the board 12, and also along the longitudinal direction of the heat transfer member 18 and the element. The modification also can achieve the same results as those of the embodiments and the third modification on the basis of the same configurations as those of the embodiments and the third modification, for example.

Figure 22:
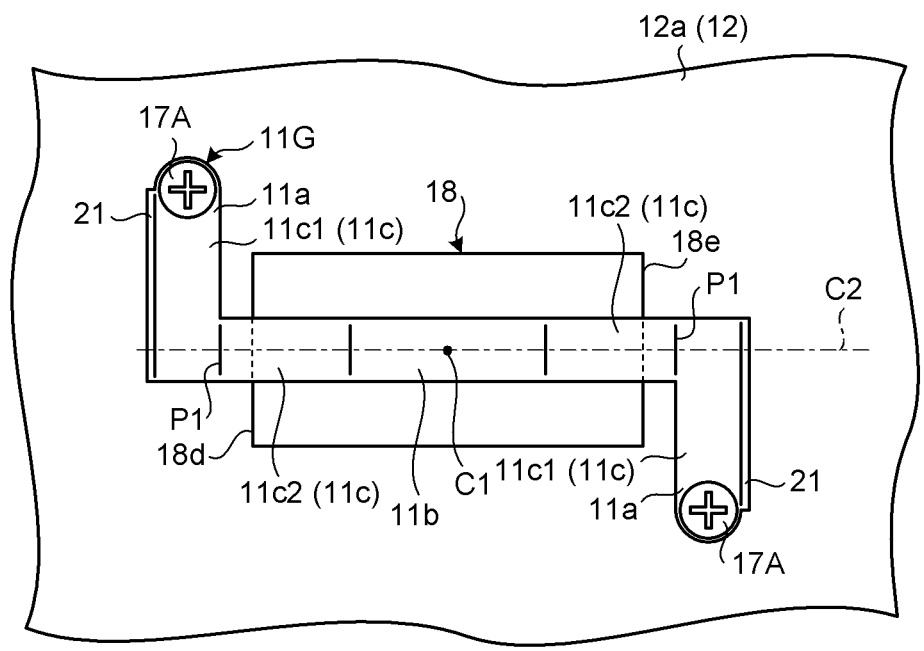
FIG. 22 is an exemplary plan view of an internal structure of the electronic device according to a fifth modification.

In a fifth modification, as exemplarily illustrated in FIG. 22, a pressing member 11G has the same configuration as the pressing member 11F in the fourth modification except for that the positions of the fixing portions 11a and the studs (not illustrated, but located under the fixing portions 11a and on the board 12) and their number, and the positions, the shapes, and the extending directions of the arms 11c, differ from those of the pressing member 11F. Specifically, in the modification, the pressing member 11G comprises the two arms 11c each having an L shape (or a V-character shape) in the plan view of the surface 12a of the board 12 and has an S shape (a crank-like shape) as a whole. That is, the second portions 11c2 of the arms 11c, the pressing portion 11b, and the positions P1 are arranged in a straight line manner on the center line C2 along the longitudinal direction of the heat transfer member 18 and the element (not illustrated, but located under the heat transfer member 18 and on the board 12). The second portions 11c2 and the pressing portion 11b extend along the center line C2 in a belt-like manner. The two first portions 11c1 are positioned to oppose each other so as to interpose the center line C2 therebetween, and are symmetric (point-symmetric) with respect to the central portion C1 in the plan view of the surface 12a of the board 12. The two fixing portions 11a are also positioned to oppose each other so as to interpose the center line C2 therebetween, and are symmetric (point-symmetric) with respect to the central portion C1 in the plan view of the surface 12a of the board 12. The first portions 11c1 are positioned along the edges 18d and 18e, which are located opposite to each other, of the heat transfer member 18 so as to extend in the same direction (e.g., in parallel with each other). The modification also can achieve the same results as those of the embodiments and the fourth modification on the basis of the same configurations as those of the embodiments and the fourth modification, for example.

Figure 23:
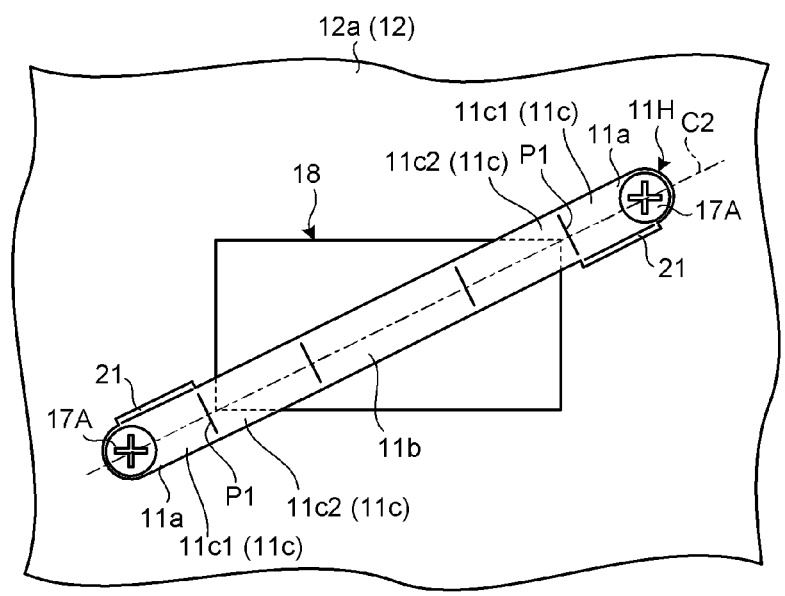
FIG. 23 is an exemplary plan view of an internal structure of the electronic device according to a sixth modification.

In a sixth modification as exemplarily illustrated in FIG. 23, a pressing member 11H has the same configuration as the pressing member 11F in the fourth modification, except that the positions of the fixing portions 11a and the studs (not illustrated, but located under the fixing portions 11a and on the board 12), and the positions and the extending directions of the arms 11c differ from those of the pressing member 11F. Specifically, in the modification, the pressing member 11H comprises the two arms 11c arranged in an I shape (a straight line shape) in the plan view of the surface 12a of the board 12. The arms 11c and the pressing portion 11b of the pressing member 11H extend along one of the diagonal lines of the heat transfer member 18 and the element (not illustrated, but located under the heat transfer member 18 and on the board 12) with a roughly constant width in the plan view of the surface 12a of the board 12. The modification also can achieve the same results as those of the embodiments and the fourth modification on the basis of the same configurations as those of the embodiments and the fourth modification, for example.

Figure 24:
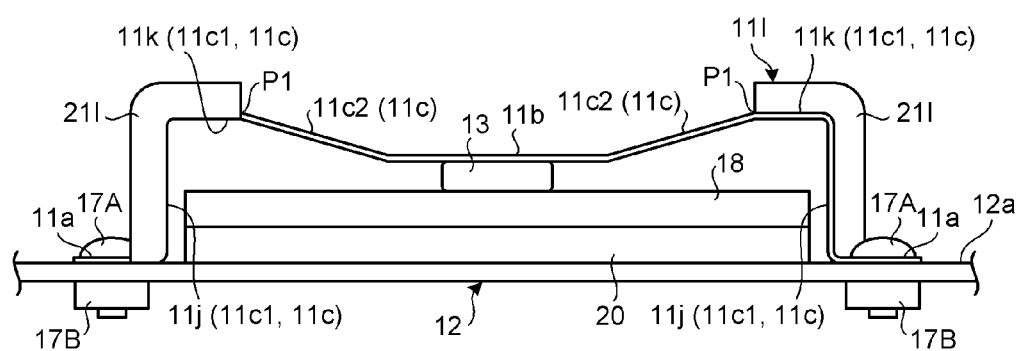
FIG. 24 is an exemplary side view of an internal structure of the electronic device according to a seventh modification.

In a seventh modification, as exemplarily illustrated in FIG. 24, a pressing member 11I is directly fixed to the board 12 (a first fixing portion) by the fixing portions 11a without interposing the studs (not illustrated). The board 12 is provided with an opening (a notch or a through hole, in the modification, e.g., through holes, which are not illustrated). For each fixing portion 11a, the jointing member 17B (in the modification, e.g., a nut) is jointed to the joint (in the modification, e.g., a male screw, which is not illustrated) of the jointing member 17A (in the modification, e.g., a screw)

passing through the opening. As a result, the fixing portion 11a and the board 12 are sandwiched by the jointing members 17A and 17B in the thickness direction of the board 12. Each arm 11c of the pressing member 11I comprises the first portion 11c1 provided with a reinforcement 21I and the second portion 11c2 located between the first portion 11c1 and the pressing portion 11b. The first portion 11c1 comprises a portion 11j and a portion 11k. The portion 11j extends in a direction intersecting (in the modification, a direction perpendicular to) the surface 12a of the board 12. The portion ilk extends in the same direction as that of the surface 12a of the board 12 (in the modification, e.g., in parallel with each other) from the edge, which is located opposite the fixing portion 11a of the portion 11j. The reinforcement 21I is bent in a direction intersecting (in the modification, e.g., a direction perpendicular to) both belt-like shaped edges of the portions 11j and ilk in the sideways direction thereof (a platy shape), and extends by a nearly constant height as a wall or a protrusion. The reinforcement 21I protrudes in a direction away from the heat transfer member 18, the element 20, and the board 12, for example. In the modification, the positions P1 are also positioned opposite the element 20 (the board 12) with respect to the heat transfer member 18. That is, the board 12, the heat transfer member 18, and the positions P1 of the pressing member 11I overlap with each other in the thickness direction of the board 12 (in a direction normal to the surface 12a of the board 12 or in a direction in which the element 20 and the heat transfer member 18 overlap with each other on the surface 12a of the board 12). The configuration according to the modification is the same as that in the first modification except for that the configurations of the first portion 11c1 and the reinforcement 21I differ from those of the first modification and no studs are provided. The modification also can achieve the same results as those of the embodiments and the first modification on the basis of the same structures as those of the embodiments and the first modification, for example.

Figure 25:
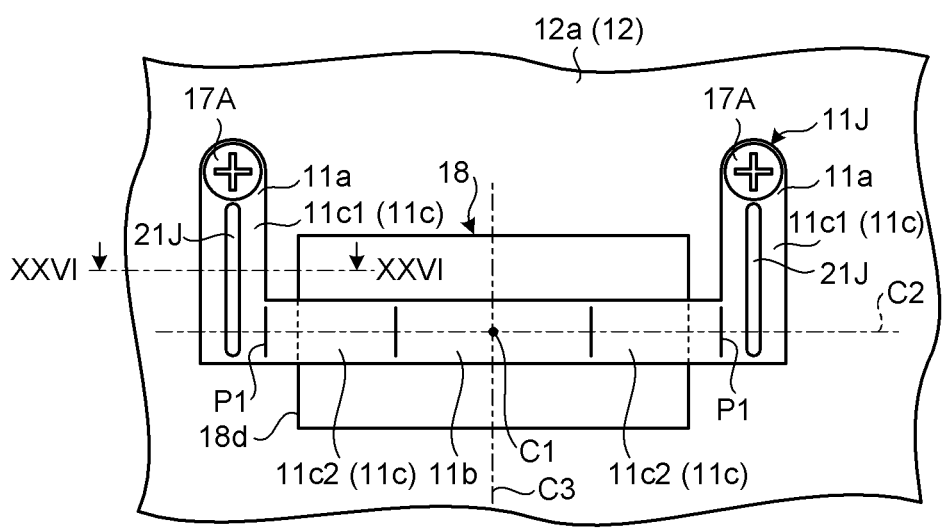
FIG. 25 is an exemplary plan view of an internal structure of the electronic device according to an eighth modification.
Figure 26:
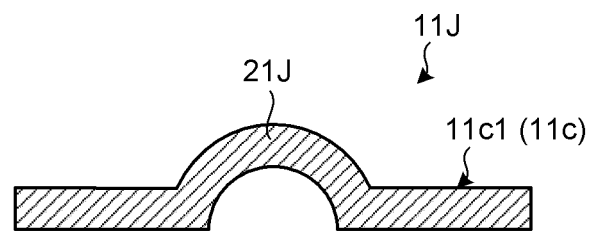
FIG. 26 is an exemplary cross sectional view taken along line XXVI-XXVI of FIG. 25, in the eighth modification.

In an eighth modification, as exemplarily illustrated in FIGS. 25 and 26, a pressing member 11J has the same configuration as the pressing member 11G in the fifth modification, except that the positions of the fixing portions 11a and the studs (not illustrated, but located under the fixing portions 11a and on the board 12), the positions and the extending directions of the arms 11c, and the configuration of reinforcements 21J differ from those of the pressing member 11G. Specifically, in the modification, the pressing member 11J comprises the two arms 11c each having an L shape (or a V shape) in the plan view of the surface 12a of the board 12 and has a U shape (a C-character shape) as a whole. That is, the second portions 11c2 of the arms 11c, the pressing portion 11b, and the positions P1 are arranged in a straight line manner on the center line C2 extending along the longitudinal direction of the heat transfer member 18 and the element (not illustrated, but located under the heat transfer member 18 and on the board 12). The second portions 11c2 and the pressing portion 11b extend along the center line C2 in a belt-like manner. The two first portions 11c1 are positioned on one side of the center line C2 and axisymmetric to a center line C3 extending along the sideways direction of the heat transfer member 18 and the element in the plan view of the surface 12a of the board 12. The two fixing portions 11a are also arranged on one side of the center line C2 and symmetric (axisymmetric) to the center line C3 in the plan view of the surface 12a of the board 12. The two first portions 11c1 are positioned along the edges 18d and 18e, which are located opposite to each other of the heat transfer member 18 so as to extend in the same direction (e.g., in parallel with each other). Each reinforcement 21J is formed as a protrusion protruding on one side in the thickness direction of the first portion 11c1 (a recessed portion or a groove recessed on the other side) at an intermediate portion (in the modification, e.g., a central portion) in the width direction of the first portion 11c1. That is, in the modification, the cross-sectional surface of the first portion 11c1 in a direction intersecting the extending direction of the first portion 11c1 has a bent shape. The reinforcement 21J extends between the fixing portion 11a and the position P1. As a result, according to the modification, the stiffness of the first portion 11c1 is readily further increased than when no reinforcement 21J is provided. The modification also can achieve the same results as those of embodiments and the fifth modification on the basis of the same configurations as those of the embodiments and the fifth modification, for example. The position and shape of the reinforcement 21J are not limited to those in the example of FIG. 26.

Figure 27:
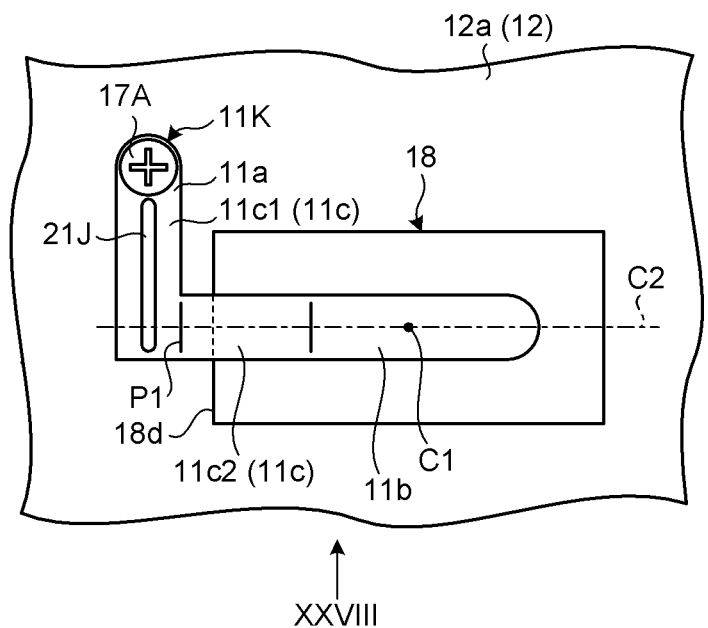
FIG. 27 is an exemplary plan view of an internal structure of the electronic device according to a ninth modification.
Figure 28:
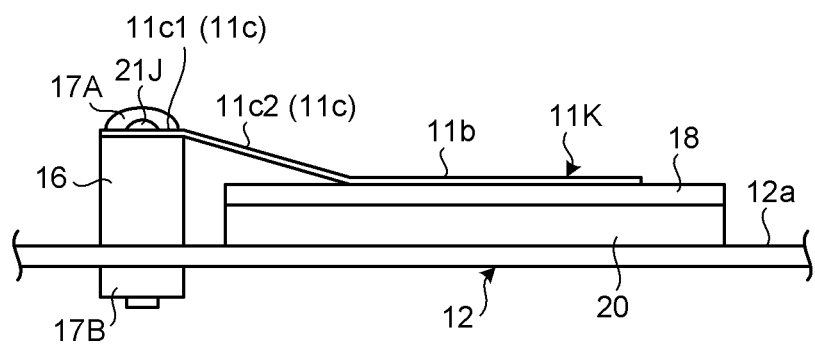
FIG. 28 is an exemplary side view of the internal structure of FIG. 27 as viewed from direction XXVIII of FIG. 27, in the ninth modification.

In a ninth modification, as exemplarily illustrated in FIGS. 27 and 28, a pressing member 11K has the same configuration as the pressing member 11J in the eighth modification except that the numbers of fixing portions 11a, studs 16, and arms 11c differ from those of the pressing member 11J. Specifically, in the modification, the pressing member 11K comprises one each of the fixing portion 11a, the stud 16, and the arm 11c. That is, one end portion (the fixing portion 11a) of the pressing member 11K is fixed to the board 12 (a housing, which is not illustrated) and the other end portion (the pressing portion 11b) of the pressing member 11K presses the heat transfer member 18 and the element 20 in the thickness direction of the board 12 (the overlapping direction of the board 12, the element 20, and the heat transfer member 18). The pressing member 11K, as exemplarily illustrated in FIG. 28, is provided in a cantilever fashion as viewed along the surface 12a of the board 12. The modification also can achieve the same results as those of the embodiments and the eighth modification on the basis of the same configurations as those of the embodiments and the eighth modification, for example.

Figure 29:
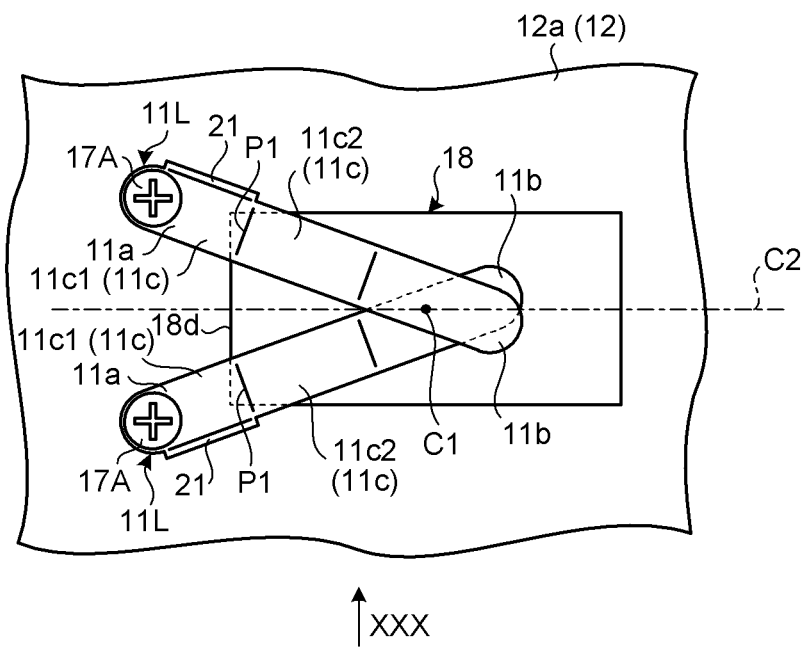
FIG. 29 is an exemplary plan view of an internal structure of the electronic device according to a tenth modification.
Figure 30:
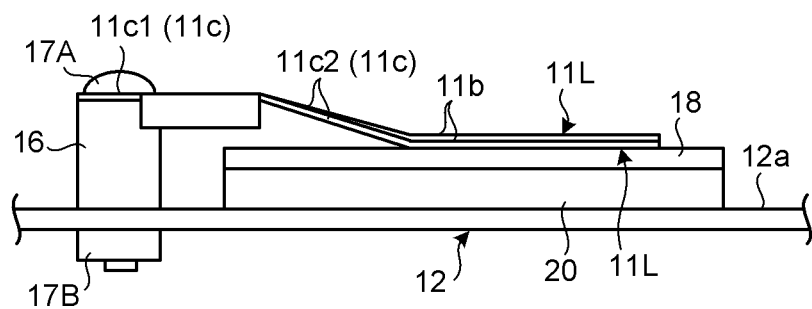
FIG. 30 is an exemplary side view of the internal structure of FIG. 29 as viewed from direction XXX of FIG. 29, in the tenth modification.

As exemplarily illustrated in FIGS. 29 and 30, the structure according to a tenth modification is the same as that in the sixth modification except that the numbers of pressing members 11L, fixing portions 11a, studs 16, and arms 11c differ from those in modification 6. Specifically, in the modification, the pressing member 11L comprises one of each of the fixing portion 11a, the stud 16 and the arm 11c, while the pressing member 11H in the sixth modification comprises two each of the fixing portion 11a, the stud 16 and the arm 11c. That is, one end portion (the fixing portion 11a) of the pressing member 11L is fixed to the board 12 (a housing, which is not illustrated) and the other end portion (the pressing portion 11b) of the pressing member 11L presses the heat transfer member 18 and the element 20 in the thickness direction of the board 12 (the overlapping direction of the board 12, the element 20, and the heat transfer member 18). The pressing member 11L, as exemplarily illustrated in FIG. 30, is provided in a cantilever fashion as viewed along the surface 12a of the board 12. Each fixing portion 11a and stud 16 of the two pressing members 11L are positioned near the corner 18a on one side in the longitudinal direction of the heat transfer member 18 and the element 20. The pressing portions 11b of the two pressing members 11L overlap with each other in the thickness direction of the board 12 (the overlapping direction of the board 12, the element 20, and the heat transfer member 18) in the central area C1 of the heat transfer member 18 and the element 20 in the plan view of the surface 12a of the board 12. According to the modification, the configuration of the pressing member 11L is readily simplified, for example. The modification also can achieve the same results as those of the embodiments and the sixth modification on the basis of the same configurations as those of the embodiments and the sixth modification, for example. The two pressing members 11L may have the same shape.

Figure 31:
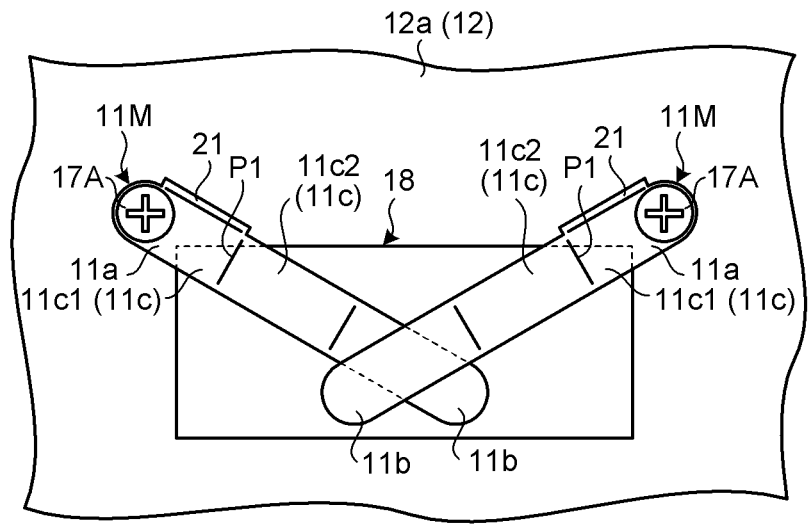
FIG. 31 is an exemplary plan view of an internal structure of the electronic device according to an eleventh modification.

As exemplarily illustrated in FIG. 31, the structure according to an eleventh modification is the same as that in the tenth modification except that the positions of pressing members 11M, the fixing portions 11a, the studs 16, and arms 11c differ from those of the tenth modification. Specifically, in the modification, the pressing member 11M can have the same configuration as the pressing member 11L. However, each fixing portion 11a of the two pressing members 11L and stud 16 are positioned near each corner 18a on one side in the sideways direction of the heat transfer member 18 and the element 20. The modification also can achieve the same results as those of the embodiments and the tenth modification on the basis of the same configurations as those of the embodiments and the tenth modification, for example. The two pressing members 11M may have the same shape.

Figure 32:
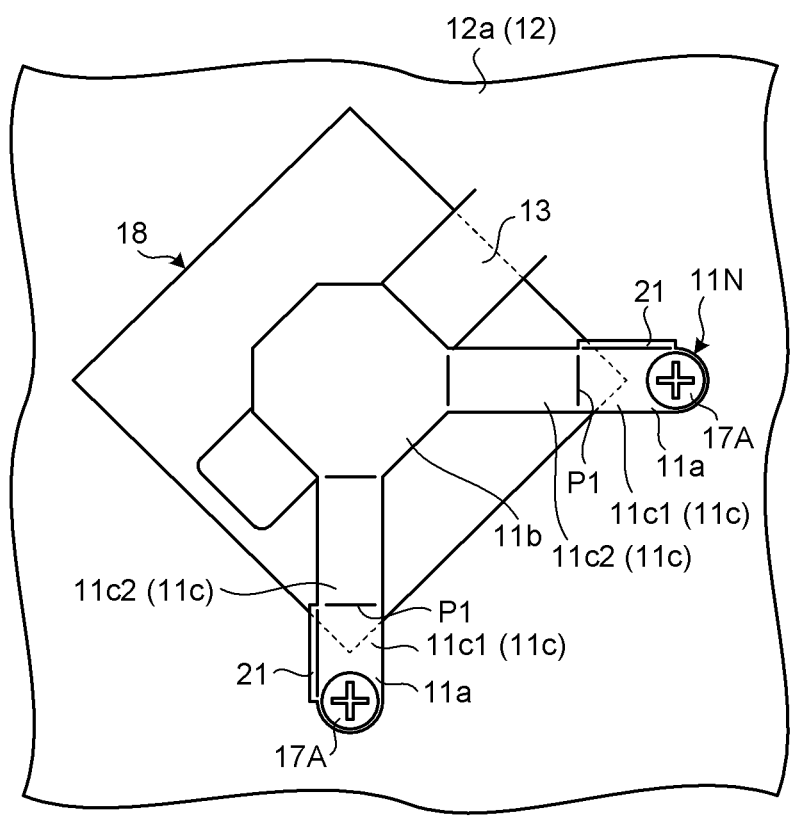
FIG. 32 is an exemplary plan view of an internal structure of the electronic device according to a twelfth modification.

In a twelfth modification, as exemplarily illustrated in FIG. 32, a pressing member 11N has the same configuration as the pressing member 11C in the first modification, except that the numbers of fixing portions 11a, studs (not illustrated, but located under the fixing portions 11a and on the board 12), and arms 11c differ from those of the pressing member 11C. Specifically, in the modification, the pressing member 11N comprises two each of the fixing portion 11a, the stud 16 and the arm 11c, while the pressing member 11C in modification 1 comprises four of each of the fixing portion 11a, the stud 16 and the arm 11c. The two fixing portions 11a (and the studs) of the pressing member 11N are positioned near the corners 18a, which are located at both ends in the longitudinal direction of one side (one edge) of the heat transfer member 18 and the element 20, in the plan view of the surface 12a of the board 12. The two arms 11c are arranged in a V shape (an L-character shape) in the plan view. In the modification, the pressing member 11N is provided in a cantilever fashion as viewed along the surface 12a of the board 12 (as viewed from the left lower side of FIG. 32). The modification also can achieve the same results as those of the embodiments and the first modification on the basis of the same configurations as those of the embodiments and the first modification, for example.

Figure 33:
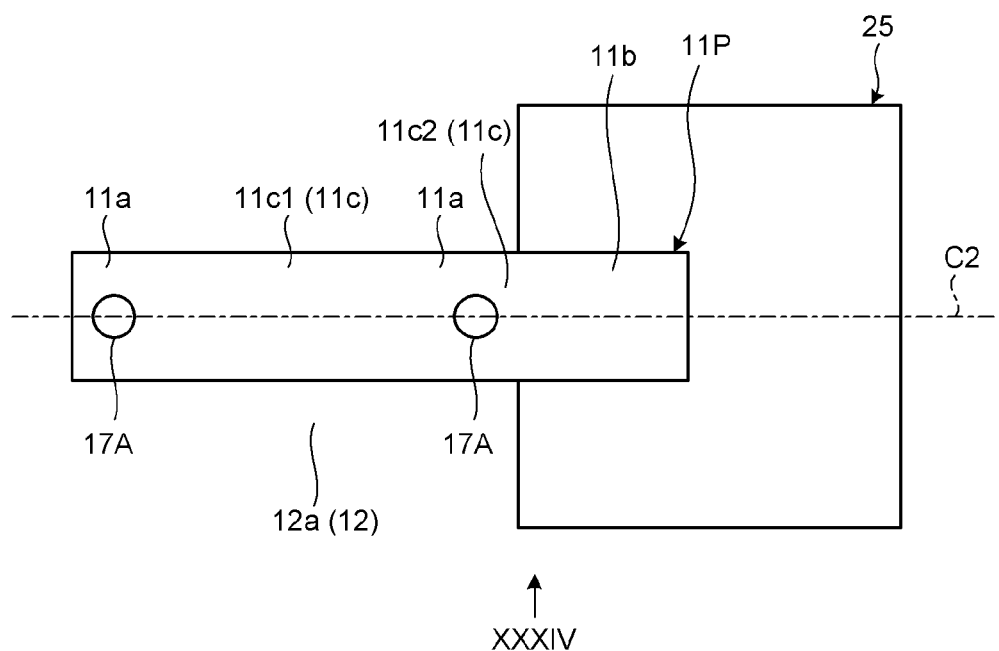
FIG. 33 is an exemplary plan view of an internal structure of the electronic device according to a thirteenth modification.
Figure 34:
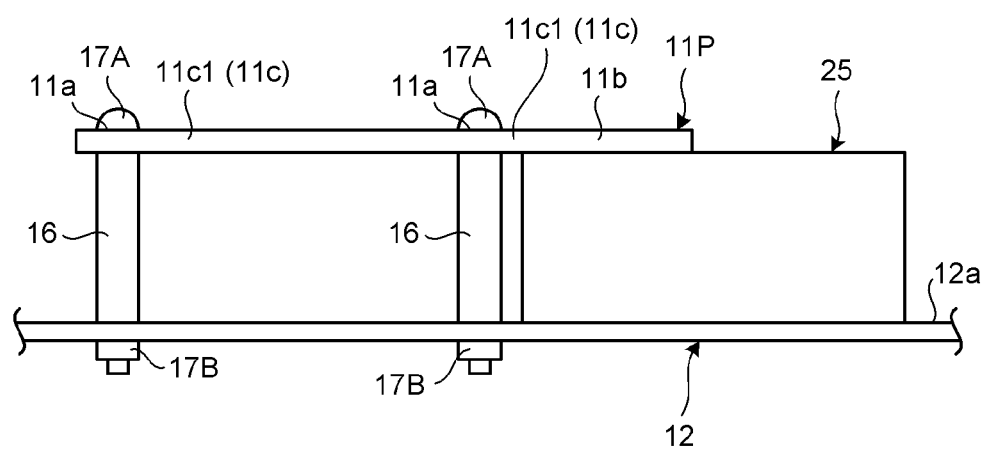
FIG. 34 is an exemplary side view of the internal structure of FIG. 33 as viewed from direction XXXIV of FIG. 33, in the thirteenth modification.

In a thirteenth modification, as exemplarily illustrated in FIGS. 33 and 34, the number of fixing portions 11a and studs (not illustrated, but located under the fixing portions 11a and on the board 12), their positions, and the shape of the arm 11c of a pressing member 11P differ from those of the above-described embodiments and modifications. As illustrated in FIG. 33, the fixing portions 11a, the studs 16, the pressing portion 11b, and the arm 11c are positioned on and along the center line C2 of a component 25 placed on the surface 12a of the board 12, and the pressing member 11P has an I shape (a belt-like shape) as a whole in the plan view of the surface 12a of the board 12. The pressing member 11P is fixed to the board 12 by a plurality of fixing portions 11a (in the modification, e.g., two fixing portions 11a) with the studs 16 to which the fixing portions 11a are jointed by the jointing members 17A (in the modification, e.g., screws), for example. The studs 16 are fixed to the board 12 by the jointing members 17B (in the modification, e.g., nuts) so as to sandwich the board 12 therebetween. The pressing member 11P has a platy shape. In the arm 11c, the portion located between the fixing portions 11a is an example of the first portion 11c1, while the portion from the fixing portion 11a located near the component 25 to the edge on the component 25 is an example of the second portion 11c2 and the pressing portion 11b. In the modification, slanting of the arm 11c at the fixing portion 11a located near the component 25 is suppressed by jointing (fixing) the fixing portion 11a to the stud 16 located away from the component 25, for example. That is, the fixing portion 11a and the stud 16 located away from the component 25 are examples of the suppressing portion that prevents the arm 11c from being tilted, displaced, moved, or deformed. In this way, according to the modification, the slanting (displacement) of the arm 11c is readily suppressed. The modification also can achieve the same results as those of the above-described embodiments and modifications on the basis of the same structures as those of the embodiments and the modifications, for example.

Figure 35:
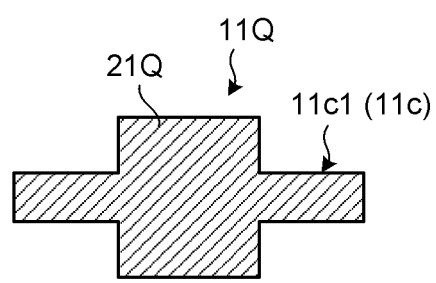
FIG. 35 is an exemplary cross sectional view of a pressing member according to a fourteenth modification.

While the embodiments of the invention have been described, the embodiments have been presented by way of examples only, and are not intended to limit the scope of the invention. The embodiments described herein may be embodied in a variety of other forms. Furthermore, various omissions, substitutions and changes of the embodiments described herein may be made without departing from the spirit of the invention. The accompanying claims and their equivalents are intended to cover the embodiments or the modifications as would fall within the scope and spirit of the invention. The embodiments are not intended to limit the scope of the invention and various modifications can be made. As an example, as illustrated in FIG. 35, a reinforcement 21Q can be formed as a portion having a thickness thicker than that of the other portion of the arm 11c of a pressing member 11Q. The specifications (e.g., the structure, the type, the set direction, the shape, the size, the length, the width, the thickness, the height, the number of elements, the arrangement, the position, or the material) of each element can be suitably changed.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A television receiver comprising:
a housing;
a display comprising a screen, at least a portion of the display being housed in the housing;
a first component configured to be housed in the housing on a side of the display opposite the screen of the display;
a second component configured to be housed in the housing on the side of the display opposite the screen of the display, and to overlap with the first component; and
a pressing member configured to be housed in the housing on the side of the display opposite the screen of the display, and to press the first component against the second component, wherein
the pressing member comprises:
two second fixing portions configured to be fixed to two first fixing portions, respectively, provided in the housing;

a pressing portion configured to press the first component;

a first arm connected to the pressing portion and extended between the pressing portion and one of the two second fixing portions;

a second arm connected to the pressing portion and extended between the pressing portion and other one of the two second fixing portions;

a first reinforcement comprising a first portion extended from the one of the second fixing portions of the first arm to a first middle point between the one of the second fixing portion and the pressing portion, and positioned away from one of the first fixing portions; and a second reinforcement comprising a second portion extended from the other one of the second fixing portions of the second arm to a second middle point between the other one of the second fixing portions and the pressing portion, and positioned away from other one of the first fixing portions, wherein the second fixing portions are positioned on one side of the first component.

2. The television receiver of claim 1, wherein the first middle point and the second middle point are located opposite the second component with respect to the first component.

3. The television receiver of claim 1, wherein the first middle point and the second middle point are located on sides of the pressing portion, respectively, so as to interpose the pressing portion therebetween.

4. The television receiver of claim 1, wherein the first middle point, the second middle point, and the pressing portion are positioned along a longitudinal direction of the first component as viewed from an overlapping direction of the first component and the second component.

5. The television receiver of claim 1, wherein the first middle point, the second middle point, and the pressing portion are positioned on a line passing through a center of the first component as viewed from an overlapping direction of the first component and the second component.

6. The television receiver of claim 1, wherein
the first reinforcement extends between a first end portion positioned near one of the second fixing portions and a second end portion positioned opposite the one of the second fixing portions with respect to a line passing through a center of the first component as viewed from an overlapping direction of the first component and the second component, and
the second reinforcement extends between a third end portion positioned near other one of the second fixing portions and a fourth end portion positioned opposite the other one of the second fixing portions with respect to the line passing through the center of the first component as viewed from the overlapping direction.

7. The television receiver of claim 1, wherein the first arm is bent at the first middle point and the second arm is bent at the second middle point.

8. The television receiver of claim 1, wherein a first cross-sectional surface of a portion including the first reinforcement of the first arm has a bent shape, the first cross-sectional surface intersecting an extending direction of the first arm, and a second cross-sectional surface of a portion including the second reinforcement of the second arm has a bent shape, the second cross-sectional surface intersecting an extending direction of the second arm.

9. The television receiver of claim 1, wherein
the first reinforcement comprises a first protrusion or a first recessed portion along the first arm, and
the second reinforcement comprises a second protrusion or a second recessed portion along the second arm.

10. The television receiver of claim 1, wherein
the first reinforcement comprises one portion thicker than other portion of the first arm, provided along the first arm, and
the second reinforcement comprises one portion thicker than other portion of the second arm, provided along the second arm.

11. An electronic device comprising:
a housing;
a first component configured to be housed in the housing;
a second component configured to be housed in the housing; and
a pressing member configured to be housed in the housing and to press the first component against the second component, wherein
the pressing member comprises:
a second fixing portion configured to be fixed to a first fixing portion provided in the housing;
a pressing portion configured to press the first component;
an arm connected to the pressing portion; and
a reinforcement comprising a portion positioned between the second fixing portion and the arm and positioned away from the first fixing portion, the reinforcement having higher stiffness than stiffness of the arm, and
the first fixing portion is positioned on one side of the first component.

12. An electronic device, comprising:
a housing;
a component; and
a pressing member configured to press the component, wherein
the pressing member comprises:
a second fixing portion configured to be fixed to a first fixing portion provided to the housing;
a pressing portion configured to press the component;
an arm configured connected to the pressing portion; and
a reinforcement comprising a portion positioned between the second fixing portion and the arm and positioned away from the first fixing portion.

* * * * *